United States Patent
Shiokawa et al.

(10) Patent No.: US 8,436,295 B2
(45) Date of Patent: May 7, 2013

(54) DEVICE FOR MEASURING MEAN FREE PATH, VACUUM GAUGE, AND METHOD FOR MEASURING MEAN FREE PATH

(75) Inventors: Yoshiro Shiokawa, Hachioji (JP); Megumi Nakamura, Tama (JP); Qiang Peng, Tama (JP)

(73) Assignee: Canon Anelva Corporation, Kawasaki-Shi (JP)

( * ) Notice: Subject to any disclaimer, the term of this patent is extended or adjusted under 35 U.S.C. 154(b) by 0 days.

(21) Appl. No.: 13/421,762

(22) Filed: Mar. 15, 2012

(65) Prior Publication Data

US 2012/0235034 A1 Sep. 20, 2012

Related U.S. Application Data

(63) Continuation of application No. PCT/JP2010/064917, filed on Sep. 1, 2010.

(30) Foreign Application Priority Data

Sep. 15, 2009 (JP) ................... 2009-213214

(51) Int. Cl.
*H05H 3/02* (2006.01)
*G01V 5/04* (2006.01)
*G01V 5/00* (2006.01)

(52) U.S. Cl.
USPC ........ 250/264; 250/265; 250/266; 250/269.1; 250/252.1

(58) Field of Classification Search ............... 250/251, 250/252.1, 255, 262, 264, 265, 266, 269.1, 250/269.2, 286, 288, 289
See application file for complete search history.

(56) References Cited

U.S. PATENT DOCUMENTS 5,825,025 A * 10/1998 Kerley .......................... 250/287
2005/0153341 A1 * 7/2005 Alexander et al. ................. 435/6
(Continued)

FOREIGN PATENT DOCUMENTS

JP 6-145974 A 5/1994
JP 8-203827 A 8/1996
(Continued)

OTHER PUBLICATIONS

International Search Report and Written Opinion dated Sep. 28, 2010 in corresponding PCT Patent Application No. PCT/JP2010/064917.

(Continued)

*Primary Examiner* — Bernard E Souw
(74) *Attorney, Agent, or Firm* — Fitzpatrick, Cella, Harper & Scinto

(57) ABSTRACT

The present invention provides a device for measuring a mean free path capable of measuring directly the mean free path of a charged particle, a vacuum gauge, and a method for measuring a mean free path. The device for measuring a mean free path according to one embodiment of the invention includes an ion source for generating an ion, a collector (24*a*) for detecting the number of first charged particles being charged particles having a first flight distance L1 that is a flight distance of zero or more from the ion source, and a collector (24*b*) for detecting the number of second charged particles having a second flight distance longer than the first flight distance. The control part of the device calculates the mean free path from a ratio between the numbers of the first and second charged particles.

11 Claims, 17 Drawing Sheets

U.S. PATENT DOCUMENTS

| | | | |
|---|---|---|---|
| 2010/0076712 A1* | 3/2010 | Aoki et al. ..................... 702/98 |
| 2010/0243884 A1 | 9/2010 | Shiokawa et al. |
| 2012/0024075 A1 | 2/2012 | Peng |
| 2012/0097847 A1 | 4/2012 | Nakamura et al. |

FOREIGN PATENT DOCUMENTS

| | | |
|---|---|---|
| JP | 2001-35919 A | 2/2001 |
| JP | 2001-44108 A | 2/2001 |
| JP | 2001-165907 A | 6/2001 |
| JP | 2001-166100 A | 6/2001 |
| WO | 2008/024825 A2 | 2/2008 |

OTHER PUBLICATIONS

International Preliminary Report on Patentability dated Oct. 13, 2011 in corresponding PCT Patent Application No. PCT/JP2010/064917.

O'Hanlon, J., Vacuum Tehnology Manual, Sangyo Tosyo, pp. 7-10 (2003).

Kumagai, H., Vacuum Science and Engineering, Shokabo, pp. 43-49 (1974).

* cited by examiner

- SHIELD CASE 603
- 310a
- 703
- 310b
- 0V
- −30V FILAMENT CASE 320
- 701 REPELLER AND MAGNET −30V
- 702 COLLECTOR AND MAGNET 0V
- 0∼+29.0V
- 703 TRAJECTORY POTENTIAL ADJUSTING PLATE

- 603
- 310
- 320: −30V
- 101: −130V
- 703

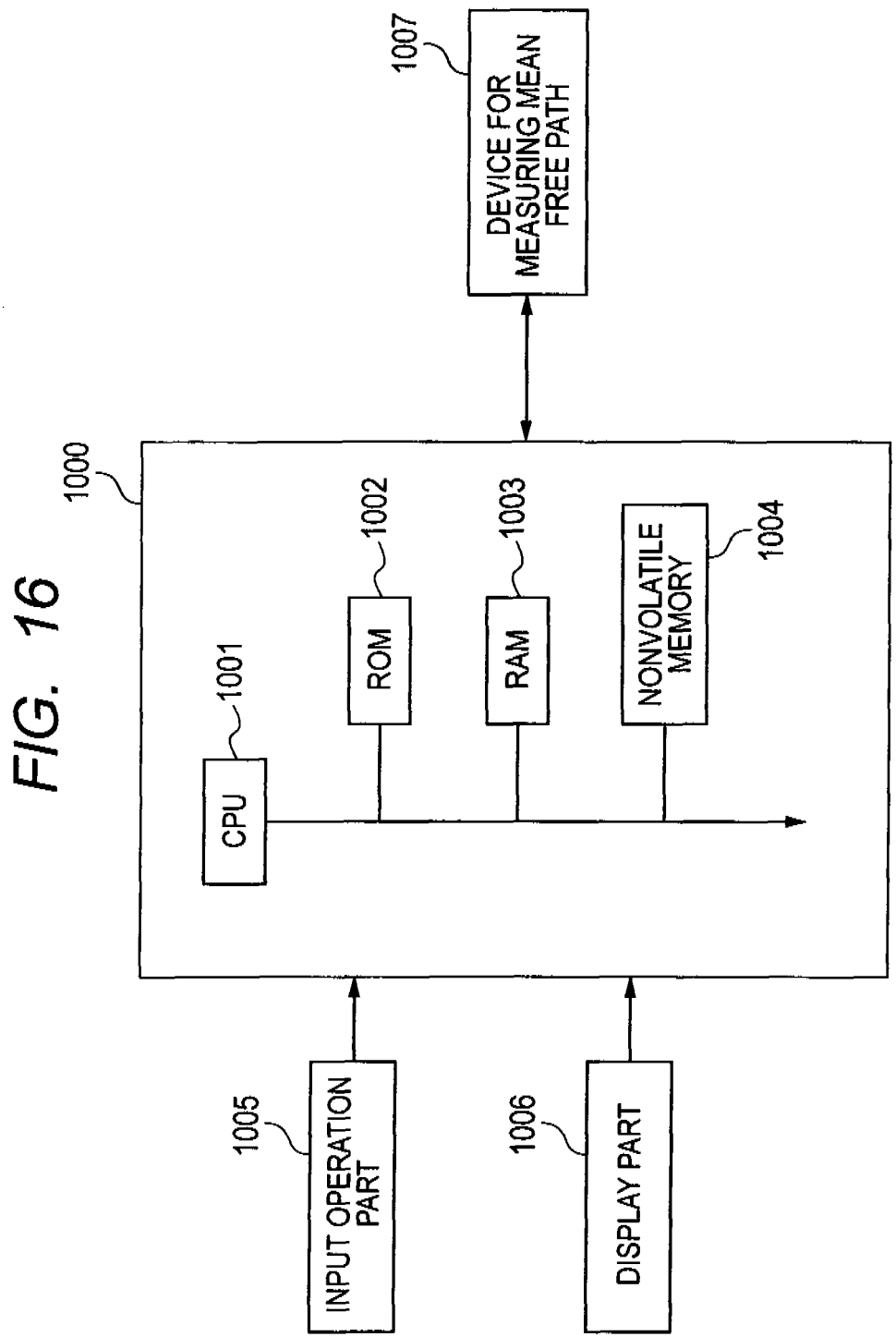

DEVICE FOR MEASURING MEAN FREE PATH, VACUUM GAUGE, AND METHOD FOR MEASURING MEAN FREE PATH

CROSS-REFERENCES TO RELATED APPLICATIONS

This application is a continuation application of International Application No. PCT/JP2010/064917, filed Sep. 1, 2010, which claims the benefit of Japanese Patent Application No. 2009-213214, filed Sep. 15, 2009. The contents of the aforementioned applications are incorporated herein by reference in their entities.

TECHNICAL FIELD

The present invention relates to a device for measuring a mean free path, a vacuum gauge, and a method for measuring a mean free path.

BACKGROUND ART

The miniaturization of semiconductor devices such as DRAMs and MRAMs proceeds more and more. In order to advance fine processing in the fabrication of such semiconductor devices, it is very important to make ions enter vertically the surface or a concave part to be processed. For example, as shown in FIG. 5 of Patent Document 1, in burying a hole having a high aspect ratio by sputtering, how to make the sputtering particles enter vertically relative to the hole bottom affects largely burying characteristics of the hole. As shown in FIG. 5 of Patent Document 1, the more sputtering particles are made to enter vertically the hole bottom, the more burying characteristics are improved.

As a method for realizing such a state, there is a so-called ion sputtering method, in which sputtering particles are ionized by a certain method and made to enter vertically relative to a substrate holder on which the substrate is placed (see Patent Document 2). In order to make ions enter vertically the substrate, DC bias or RF power negative for the substrate is applied to the substrate holder to generate a negative voltage for the substrate, thereby pulling ions in the substrate holder. In doing so, when the voltage of 100 to several hundreds volt is generated, since thermal energy of sputtering particles is considered to be about 0.1 eV at most, if no collision of ions occurs between a target and the substrate holder, ions enter the substrate substantially vertically.

However, actually, ions are scattered due to collision with another particle occurring between the target and the substrate holder to result in a broadened incidence angle.

Accordingly, in order to make ions enter the substrate vertically, it is essential to allow ions to reach the substrate without the collision with another particle in an accelerated region.

Here, the region in which ions are accelerated is a region called a cathode fall or a sheath existing near a cathode. Much of potential variations being generated during the discharge are generated in this part. The thickness thereof depends on the pressure in the discharge space, the power applied to the substrate holder, etc., and, typically, is about from 10 to 30 mm.

Accordingly, if ions are allowed to pass the region of the cathode fall or sheath without collision, it becomes possible to make an ion beam having a small divergence angle enter the substrate.

Here, an average distance in which a particle can move without collision is called a mean free path.

If the mean free path in an actual process gas is known, by adjusting the process condition to make the mean free path longer than the length of the cathode fall or sheath, incidence ions having a small divergence angle can be obtained.

Moreover, in dry etching, too, the same is applicable. In order to perform etching leading to a highly anisotropic shape, it is necessary to make ions of a small divergence angle enter a surface to be etched in a beam-like shape. In this case, too, if the mean free path in an actual etching gas is known, by adjusting the process conditions to make the mean free path longer than the length of the cathode fall or sheath, it becomes possible to make ion beams of a small divergence angle enter the surface to be etched.

[Patent Document 1] Japanese Patent Laid-Open No. 8-203827
[Patent Document 2] Japanese Patent Laid-Open No. 2001-35919
[Patent Document 3] Japanese Patent Laid-Open No. 2001-165907
[Non-patent Document 1] John F. O'Hanlon, "Vacuum Technology Manual", SANGYO TOSYO, PP 7 to 10
[Non-patent Document 2] Hiroo Kumagai, three others, "Vacuum Science and Engineering", Shokabo, pp 43 to 49

SUMMARY OF INVENTION

As described above, when performing sputtering or dry etching, it is effective to obtain the mean free path in order to perform a better processing.

Heretofore, when obtaining the mean free path of a prescribed ion in a prescribed gas atmosphere, temperature, and a particle diameter of a prescribed gas and a diameter of a prescribed ion are obtained, and, using the values, by conversion from a gas number density and pressure, the mean free path is obtained (see Non-patent Documents 1 and 2). In other words, previously, the mean free path is obtained not directly, but is obtained indirectly by calculation from temperature, and a particle diameter and ion diameter of a gas. Accordingly, the mean free path can not be obtained, if the temperature of a system in which ions move, and the diameter of the ion, and the particle diameter of the atmosphere gas are not known.

Here, "the gas number density" is, if the gas is of a molecule, the number of molecules per a unit volume, and, if the gas is of a monoatomic molecule, the number of atoms per a unit volume.

Moreover, in particular, when obtaining the diameter of the gas or ion, it is necessary to decide existing components by a mass spectrometer prepared separately, and to obtain the diameter from literature data, and, in a previous step of calculation for obtaining the mean free path, too, considerable labor is required. Furthermore, when the atmosphere gas is not of one kind but is a mixed gas, it is necessary to obtain an existence ratio (a component ratio) of components by a mass spectrometer, and to perform calculation with weighting, thereby obtaining the final mean free path.

As described above, when the diameter of ions, particle diameter of the atmosphere gas or temperature is not known, it becomes difficult to convert the mean free path from the pressure and the gas number density, or, even when they are known, in the case of a mixed gas, the conversion calculation becomes complex.

The mean free path can be used in various fields, not restricted to sputtering and dry etching.

For example, the mean free path can show a vacuum degree. There are three methods for showing the vacuum degree (a level of vacuum), that is, "the gas number density", "the pressure" and "the mean free path", and, until now, the gas number density or the pressure is used. These three may be converted to each other using the molecular diameter and temperature of the atmosphere gas as parameters, and show theoretically the same quantity, but phenomena to be utilized are different to such a degree as can be said completely separated.

Presently, in processes such as sputtering and dry etching that are important industrially, the mean free path has a direct relation among these three, and, next, the gas number density has a relation. Because, collision between a gas (a neutral molecule) and an ion, collision between gasses themselves, and the gas flow constitute a key of these processes. Accordingly, if the mean free path can be obtained directly and accurately, and simply, a more useful representation of the vacuum degree is possible.

Although it is very useful to obtain directly the mean free path that exhibits effectiveness in various fields as described above by a simple and accurate method without performing complicated calculation and measurement, no method for obtaining directly the mean free path is currently established.

The present invention was achieved in consideration of such a problem, and has an object of providing a device for measuring a mean free path, a vacuum gauge, and a method for measuring the mean free path, capable of measuring accurately and simply the mean free path of a charged particle.

In order to achieve the object, the invention is a device for measuring a mean free path of a charged particle in an atmosphere gas, characterized by including a generation source for generating the charged particle, a detection means for detecting a number of first charged particles having a first flight distance that is a flight distance of zero or more from the generation source and detecting a number of second charged particles having a second flight distance longer than the first flight distance, and a calculation means for calculating the mean free path from a ratio between the numbers of the first and second charged particles.

The invention is also a vacuum gauge for measuring a vacuum degree, characterized by including a generation source for generating a charged particle, a detection means for detecting a number of first charged particles having a first flight distance that is a flight distance of zero or more from the generation source and detecting a number of second charged particles having a second flight distance longer than the first flight distance, and a calculation means for calculating the mean free path from a ratio between the numbers of the first and second charged particles.

The invention is also a device for measuring a mean free path of a charged particle in an atmosphere gas, characterized by including a generation source for generating the charged particle, a detection means for detecting a number of first charged particles having a first flight distance that is a flight distance of zero or more from the generation source and detecting a number of second charged particles having a second flight distance longer than the first flight distance, and a storing means for storing the detected numbers of the first and second charged particles.

The invention is also a device for measuring a mean free path of a charged particle in an atmosphere gas, characterized by including a generation source for generating the charged particle, a detection means for detecting a number of first charged particles having a first flight distance that is a flight distance of zero or more from the generation source and detecting a number of second charged particles having a second flight distance longer than the first flight distance, and a display means for displaying the numbers of the detected first and second charged particles.

The invention is also a control device for controlling a device including a generation source for generating a charged particle, and a detection means for detecting a number of first charged particles having a first flight distance that is a flight distance of zero or more from the generation source and detecting a number of second charged particles having a second flight distance longer than the first flight distance, characterized by including a means for controlling the generation source so as to generate the charged particle to make the detection means detect the numbers of the first and second charged particles, a means for obtaining the numbers of the first and second charged particles, and a calculation means for calculating the mean free path from a ratio between the numbers of the obtained first and second charged particles.

Furthermore, the invention is a method for measuring a mean free path of a charged particle in an atmosphere gas, characterized by including the steps of generating the charged particle from a generation source, detecting the number of first charged particles having a first flight distance that is a flight distance of zero or more from the generation source and detecting a number of second charged particles having a second flight distance longer than the first flight distance, and calculating the mean free path from a ratio between the numbers of the first and second charged particles.

BRIEF DESCRIPTION OF THE DRAWINGS

FIG. 16 is a block diagram showing a schematic configuration of a control system in the device for measuring a mean free path according to the invention.

DESCRIPTION OF EMBODIMENTS

Figure 1A:
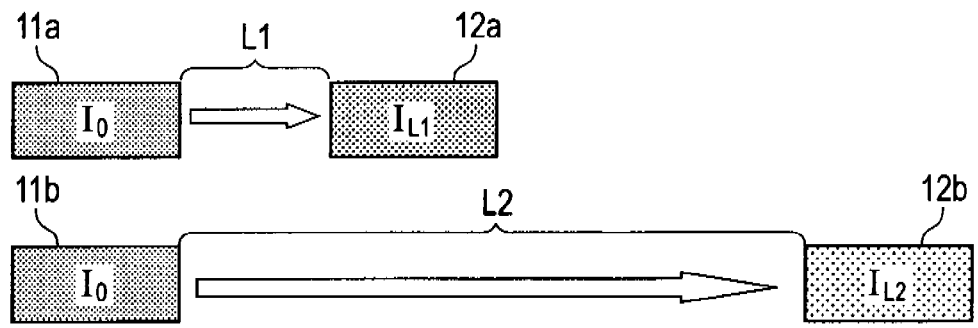
FIG. 1A is a drawing showing the fundamental principle of the invention.

Hereinafter, embodiments of the invention are explained in detail with reference to the drawings. Meanwhile, in the drawings explained below, those having the same function are given the same reference numeral and the repeated explanation thereof is omitted.

In one embodiment of the invention, using a novel new principle, the mean free path of charged particles such as ions and electrons are obtained directly. That is, the fundament of the new theory characteristic of the present invention is to measure a decayed quantity of charged particles (ions or electrons) caused to fly two different distances (a shorter distance includes distance 0) by the collision with neutral molecules being an atmosphere gas, and to calculate the mean free path (the average value of distances that charged particles can proceed without the collision) of the charged particles from a ratio thereof.

The decay is the same exponential phenomenon as the decay of a radioactive element, in which the existing quantity always becomes a certain percentage of the previous quantity when a certain time (a flight distance) proceeds. Habitually, in the case of radioactive elements, the time until the existing quantity becomes one-half is defined as a half-life, but, in the case of the mean free path, the flight distance that becomes 1/e (0.37 times) is defined as the mean free path. Since the decay is exponential as described above, when decayed quantities at two different flight distances are known, the mathematical calculation of a decay intensity (that is, the mean free path) becomes possible.

Meanwhile, in respective embodiments described later, the mean free path of charged particles (ions or electrons) in neutral molecules (in a prescribed gas atmosphere) is obtained. When charged particles are ions, the mean free path of ions in the gas atmosphere (neutral molecules) is substantially equal to the mean free path of the neutral molecule corresponding to the ion in the gas atmosphere (neutral molecules). Accordingly, by obtaining the mean free path of a prescribed ion in a prescribed gas atmosphere (neutral molecules), the mean free path of the neutral molecule corresponding to the prescribed ion in the prescribed gas atmosphere (neutral molecules) can be obtained.

Meanwhile, "the neutral molecule corresponding to the ion" means the neutral molecule before the ionization of the ion.

As a fundamental structure realizing the new principle, two collectors (detectors) having different distances from a generation source for generating charged particles (for example, such as an ion source and an electron source) (a shorter distance includes distance 0 from the generation source) are placed on the flying axis of the charged particles. At this time, when two collectors are placed on the same flying axis of charged particles, a nearer collector is given such a structure as a mesh-like shape that can catch a part of entering charged particles and allow another part to penetrate, so that a part of the charged particles penetrate there to reach a farther collector. It is sufficient that values of the penetration ratio of the mesh and flight distance are known precisely, and so the values are arbitrary.

When two collectors are placed on different flying axes of charged particles, numbers of charged particles are measured by the two collectors. On this occasion, the generation sources may be prepared in the number equivalent to the number of collectors, or one generation source may be provided on a rotatable stage so that the rotatable stage is rotated to allow charged particles from the generation source on the rotatable stage to enter respective collectors. In this case, "calibration without decay" to be described later may be performed.

As described above, in the invention, it is not an issue whether two collectors are provided on the same flying axis of charged particles or not, but it is important to measure numbers of the charged particles by each of at least two collectors provided at different distances from a generation source. Because, in the invention, the essence is to use the ratio between numbers of charged particles in order to eliminate such a factor as the variation of the generation quantity of charged particles in the generation source, and in order to obtain the ratio, at least two collectors provided at different distances from the generation source are provided.

Meanwhile, the number of collectors is not limited to two, but may be not less than three (see the first to ninth embodiments described later). Furthermore, the number of collectors may be one, only if the structure enables at least two flight distances of charged particle to be measured (see the tenth embodiment described later).

In other words, in the invention, the essence is to obtain the mean free path using the ratio between numbers of charged particles, and, for that purpose, the number of the first charged particles of charged particles having flied up to the first flight distance (a distance of zero or more) is detected, and, furthermore, the number of the second charged particles of charged particles having flied up to the second flight distance longer than the first flight distance is detected. Accordingly, only if numbers of the first and second charged particles can be measured, the number or structure of collectors may be arbitrary.

In the new principle, since absolute values of decayed quantities are unnecessary, but only the ratio between the both is necessary, even when the quantity of charged particles in the generation source of original charged particles varies largely, or the detection side varies due to contamination or deformation of an electrode, they have no relation. That is, the back ground, and the variation/disturbance component are almost completely eliminated.

Moreover, in addition to the ratio between decayed quantities of charged particles, for calculating the mean free path, only the flight distance is necessary, and the absolute value thereof can be determined easily and, furthermore, does not change caused by contamination and heat. Consequently, it becomes possible to obtain the absolute value of the mean free path simply with a high accuracy. That is, it is possible to say that, the principle incorporates, so to say, a measurement standard and, by comparing with it, the absolute value is obtained.

As described above, in the new principle, the detection means is configured to detect charged particles with the first flight distance where the flight distance from the generation source is 0 m or more (but, the unit of the distance is arbitrary), and to detect charged particles of the second flight distance longer than the first flight distance. As such configuration, for example, at least a first collector for detecting charged particles of the first flight distance, and a second collector for detecting charged particles of the second flight distance are provided. Moreover, for example, the detection means may be configured to detect charged particles of the first flight distance and charged particles of the second flight distance by a single collector.

On the basis of the ratio between the number of charged particles detected after the flying by the first flight distance and the number of charged particles after the flying by the second flight distance, and of the first flight distance (for example, the distance from the generation source to the first collector) and the second flight distance (for example, the distance from the generation source to the second collector), the mean free path is obtained directly. Accordingly, since various types of variable components are not included in parameters for calculating the mean free path, the mean free path can be obtained accurately. Furthermore, since separated measurements (mass analysis) etc. are not necessary for obtaining the mean free path, different from conventional cases, the mean free path can be obtained simply and easily. Meanwhile, in the description, "the first collector" means a collector for detecting charged particles of the first flight distance where the flight distance from the generation source of charged particles such as an ion source is zero or more, out of certain two collectors. Accordingly, an internal collector provided inside the generation source can also be included in the first collector.

Further, in the description, "the second collector" is a collector for detecting charged particles of the second flight distance where the flight distance from the generation source is longer than the first flight distance, the collector having a distance from the generation source larger than the distance of the first collector.

Furthermore, in the description, "the internal collector" denotes a collector provided inside the generation source of charged particles such as an ion source. Accordingly, a collector provided outside the generation source is occasionally called "an external collector".

In the invention, when there are two collectors, a collector on the generation source side (including the internal collector) becomes the first collector, and the other collector becomes the second collector. Meanwhile, when there are three or more collectors, one of the three or more collectors (including the internal collector, but excluding the collector farthest from the generation source) becomes the first collector, and a collector located at a distance farther than the distance of the collector to be the first collector from the generation source becomes the second collector.

According to the invention, since the mean free path can directly be obtained accurately and simply, a value of a more accurate mean free path can be applied in various fields utilizing the mean free path. For example, in sputtering and dry etching, it is possible to perform accurately and simply adjustment etc. regarding the incidence of ion beams having a small divergence angle relative to a substrate or a surface to be etched.

In addition, for example, it can also be applied to fields of measuring a vacuum degree.

(Regarding the Measurement of a Vacuum Degree)

As described above, the vacuum degree can be shown by three quantities of "the gas number density", "the pressure" and "the mean free path". Conventionally, the vacuum degree is obtained by the measurement of the gas number density by an ion gauge (an ionization vacuum gauge) etc., or by the measurement of pressure (force that pushes a wall of a unit area) by a diaphragm vacuum gauge etc.

In the ion gauge, a high speed electron is made to collide with a neutral molecule being an atmosphere gas to flick an outer-shell electron to ionize the molecule, and the ions are collected to a collector (a detector) to measure an ion quantity. Since the ion quantity is proportional to the gas number density of the atmosphere gas, while specifying the energy and quantity of electrons and the shape and potential of an electrode, when the relation (a converted value) between a measured ion quantity and the gas number density has been obtained once, the gas number density can be calculated from an actually measured ion quantity.

Here, the converted value of the ion quantity and the gas number density is generally called sensitivity.

On the other hand, in the diaphragm vacuum gauge, a deformation quantity of the diaphragm existing between the atmosphere gas and a region of sufficiently good vacuum degree provided inside by force (pressure) of the atmosphere gas is measured electrically (as the magnitude of electric capacity). Since the deformation quantity depends on the pressure of the atmosphere gas, in the same manner, when a converted value or a conversion formula has been obtained once, the pressure can be calculated from the deformation quantity.

As described above, the two are different in the measurement principle and have different regions of applicable vacuum degrees, but they are the same in point that each calculates the vacuum degree by a converted value or a conversion formula from a quantity (ion quantity/deformation quantity) depending on the vacuum degree (the gas number density/pressure).

Therefore, it is indispensable for ensuring the accuracy that the absolute value of the proportional quantity is measured correctly, and that the converted value or the conversion formula has not varied, but it can be said that assuring this under all conditions over a long period is impossible. There are such problems that, in vacuum, contamination is essentially liable to occur (originally, a film adheres easily to make a vacuum process effective), and that the elimination of background and variation/disturbance components from the comparison with a reference sample or the difference from presence or absence of a sample, which has become the fundament in general measurements, can not be adopted.

In contrast, in the invention, since the mean free path is obtained by the ratio between numbers of charged particles detected by at least two collectors, and by the distance from the generation source to the collector as the flight distance of charged particles, the mean free path can be obtained in a manner by which background and variation/disturbance components have been eliminated almost completely. Since the mean free path shows the vacuum degree, according to the invention, the vacuum degree can be obtained accurately, while eliminating the background and variation/disturbance components.

Moreover, in the measurement of the vacuum degree by conventional ion gauges, due to the influence of space charges, the accuracy begins to lower at 1 Pa or more, and about 10 Pa is the measurement limit. On the other hand, in the measurement of the vacuum degree by diaphragm vacuum gauges, since the deformation quantity of the diaphragm becomes minute, the accuracy begins to lower at 1 Pa or less, and about 0.1 Pa becomes the measurement limit. In both gauges, since the accuracy deteriorates at the vacuum degree of approximately 1 Pa that is frequently used in sputtering and dry etching, a vacuum gauge capable of measuring accurately a vacuum degree in the region is desired strongly.

In contrast, in the invention, the mean free path as a vacuum degree is obtained directly almost independently of space charges and, furthermore, without using a diaphragm, the vacuum degree (the mean free path) can be obtained accurately at any vacuum degree. Consequently, vacuum degrees of approximately 1 Pa can be measured satisfactorily.

As described above, both of the conventional ion gauge and diaphragm vacuum gauge convert the quantity (ion quantity/deformation quantity) proportional to the vacuum degree (gas number density/pressure) to the vacuum degree by the conversion value or the conversion formula, and the two, the absolute value of the proportional quantity is measured correctly and the conversion value or conversion formula has not changed, are indispensable for securing the accuracy. However, the new measurement principle characteristic of the invention makes it possible to obtain the absolute value of the vacuum degree (mean free path) while not requiring the two and, furthermore, eliminating disturbance components.

Meanwhile, presently, "the vacuum degree" showing the level of vacuum and "the pressure" being one representation of the vacuum degree are frequently used in the same meaning, but, in the description, these shall be used with strict discrimination. Moreover, frequently, a state where pressure is low (low pressure) is expressed that a vacuum degree is high (high vacuum) and a state where pressure is high (high pressure) is expressed that a vacuum degree is low (low vacuum). However, in order to avoid confusion, in the description, a state where pressure is low shall be expressed that "the vacuum degree is superior" and a state where pressure is high shall be expressed that "the vacuum degree is inferior".

General explanation is given as above, and more specific explanation will be given for every item.

Meanwhile, in the following explanation, a case where ions are used as charged particles is explained, but, needless to say, charged particles may be electrons.

1) Calculation Formula

First, in order to make calculation simple, it is considered that the number of ions generated in an ion source is constant irrespective of vacuum degrees.

The number of ions before decay is denoted by $I_0$, the number of ions after decay of a flight distance: L1 is dented by $I_{L1}$, the number of ions after decay of a flight distance: L2 is dented by $I_{L2}$, and the mean free path is denoted by $\lambda$. These are shown schematically in FIG. 1A.

FIG. 1A is a schematic view for explaining the principle of the invention for obtaining the mean free path in a case of an ion source independent of a vacuum degree. In FIG. 1A, a collector 12a as a first collector is disposed at a position of distance L1 from an ion source 11a, and a collector 12b as a second collector is disposed at a position of distance L2 (L2>L1) from an ion source 11b. Each of the ion sources 11a and 11b generates ions in the same ion number $I_0$.

Meanwhile, FIG. 1A is a conceptual view showing the principle of the invention, and shows that ions output from the ion source 11a fly by the flight distance L1 to be input to the collector 12a and the collector 12a detects the ion number $I_{L1}$ after the decay, and that ions output from the ion source 11b fly by the flight distance L2 to be input to the collector 12b and the collector 12b detects the ion number $I_{L2}$ after the decay. Accordingly, in the same region (in an region of the same vacuum degree and the same temperature), the collectors 12a and 12b may be disposed on the same flying axis of ions (in this case, a single ion source functions as the ion source 11a and the ion source 11b), or, as shown in FIG. 1A, the collectors 12a and 12b may be disposed on different flying axes of ions. However, in the latter case, "calibration without decay" to be described later is preferably performed.

Then, $$I_{L1}=I_0 \cdot \exp(-L1/\lambda) \tag{1}$$

$$I_{L2}=I_0 \cdot \exp(-L2/\lambda) \tag{2}$$

and, from Formula (1) or (2), $$\lambda=-L1/\ln(I_{L1}/I_0) \tag{3}$$

$$\lambda=-L2/\ln(I_{L2}/I_0) \tag{4}$$

are obtained. Meanwhile, "ln" means natural logarithm. From Formulae (3) and (4), the mean free path $\lambda$ can be obtained from the ion number after the decay in one collector.

Further, from Formulae (1) and (2), $$\lambda=(L2-L1)/\ln(I_{L1}/I_{L2}) \tag{5}$$

is obtained. From Formula (5), the mean free path can be obtained from the comparison of ion numbers after the decay between two collectors. Meanwhile, since Formula (5) is independent of $I_0$, a measurement with high accuracy is expected. In other words, when Formula (5) is used, even when undesirable fluctuation occurs (even when $I_0$ fluctuates suddenly), since the fluctuation is not included in parameters for obtaining the mean free path, an accurate mean free path can be obtained even when the fluctuation occurs.

2) Decay Curve

Figure 1B:
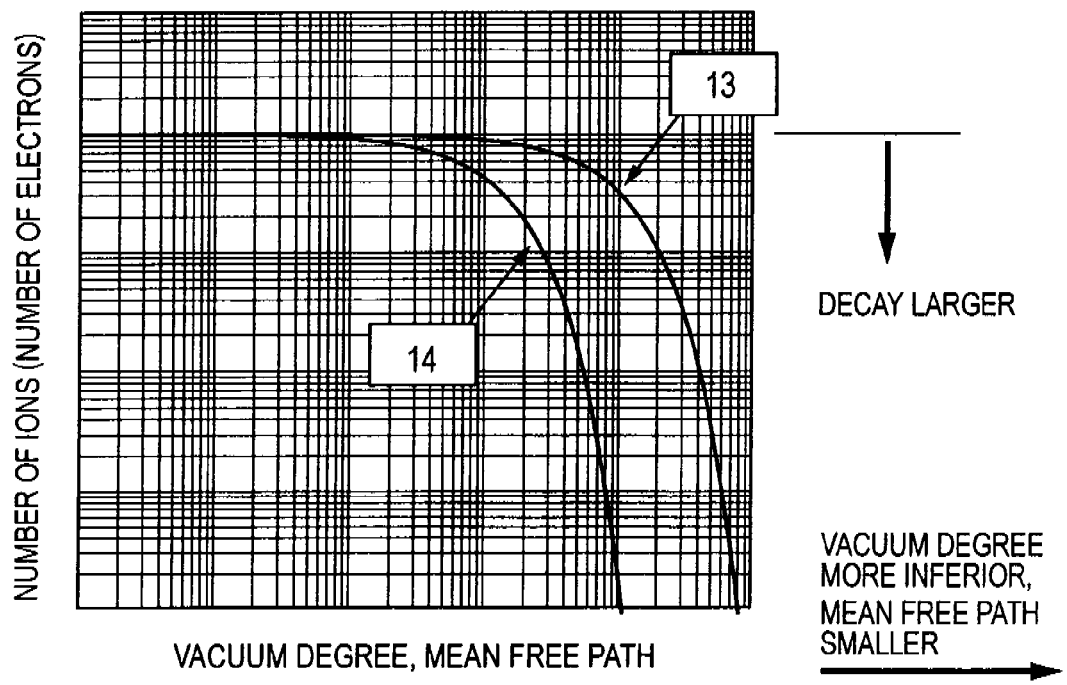
FIG. 1B is a drawing showing the fundamental principle of the invention.

The graph in FIG. 1B shows a situation of the decay of the ion number due to the flying in FIG. 1A. The horizontal axis shows the vacuum degree of the atmosphere, and the vertical axis shows the ion number after the flying. Meanwhile, the horizontal axis is shown so that the more right side the more inferior the vacuum degree, that is, the gas number density becomes larger, and, since the mean free path inversely proportional to the gas number density, on the horizontal axis, the more right side the shorter the mean free path (in other words, it is considered as the inverse number of the mean free path). In FIG. 1B, a reference numeral 13 denotes a graph showing the relation between the ion number $I_{L1}$ and the vacuum degree (the mean free path) when the flight distance is short, and a reference numeral 14 denotes a graph showing the relation between the ion number $I_{L2}$ and the vacuum degree (the mean free path) when the flight distance is long.

When the mean free path is sufficiently longer than the flight distance (the left half in FIG. 1B), the ion number is constant, that is, does not depend on the gas number density, but, when the mean free path is shorter than the flight distance (the right half in FIG. 1B), the ion number after the flying decreases (decays). When the vacuum degree is changed from a superior state to an inferior state (moved from the left to the right on the horizontal axis), the vacuum degree when the decay begins (accurately, the decay begins to be remarkable) is at a time when the mean free path becomes as short as the flight distance. Accordingly, a longer flight distance results in the beginning of the decay at a longer mean free path (in other words, at a lower gas number density=a more superior vacuum degree=on more left side on the horizontal axis). As can be seen from the reference numerals 13 and 14, the shapes of the decay itself are same irrespective of the flight distance. The reason of these decay situations is that, in Formulae (1) and (2) showing the ion number after the flying, the ratio between L1 and $\lambda$ is an exponent.

3) A Case where Vacuum Degree Dependency Exists

Figure 2A:
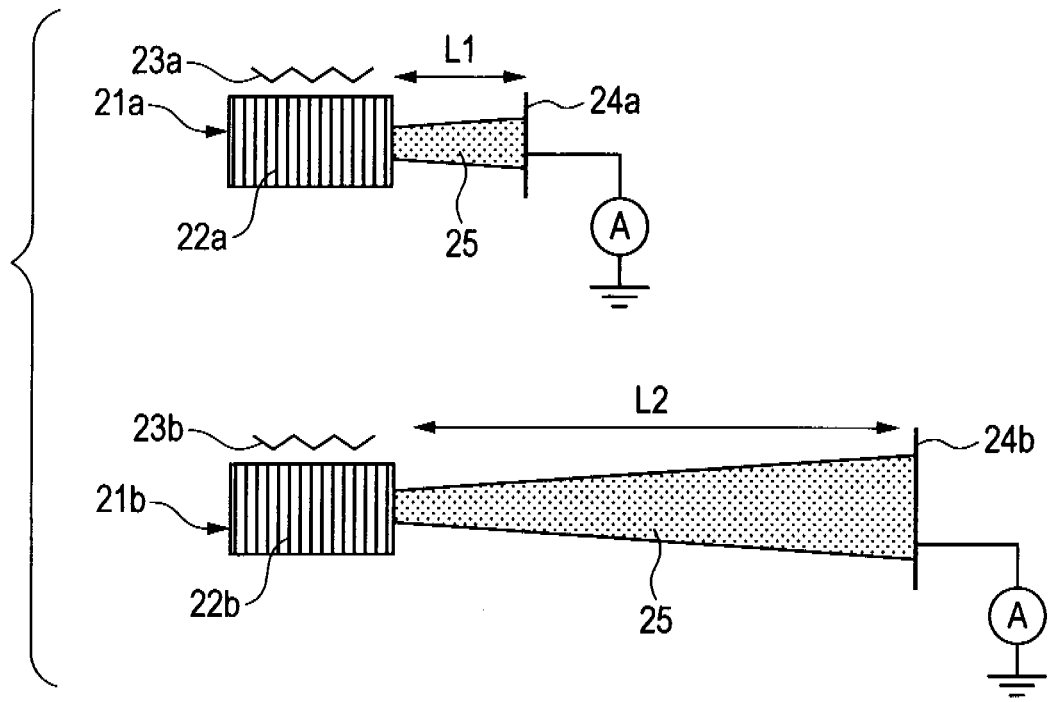
FIG. 2A is a drawing showing the fundamental principle of the invention.

In Formulae (1) to (5), it is assumed that the number of ions generated in the ion source does not depend on the vacuum degree, but, in ion gauges and ion sources based on the most general ion gauges, the ion number changes depending on the vacuum degree. That is, while explaining specifically, as in the left part in FIG. 2B, the change in an ion current is of a shape given by multiplying the curve in FIG. 1B by a proportional component of the vacuum degree. FIG. 2A is a schematic view for explaining the principle of the invention for obtaining the mean free path in the case of an ion source where an ion current depends on the vacuum degree, and FIG. 2B is a drawing for explaining a situation where the ion number decays due to the flying.

In FIG. 2A, a vacuum degree dependent type ion source 21$a$ includes a grid 22$a$ and a filament 23$a$, and, at a position of the distance L1 from the ion source 21$a$, a collector 24$a$ as the first collector is disposed. An ion beam 25 output from the ion source 21$a$ is input to the collector 24$a$. And, a vacuum degree dependent type ion source 21$b$ includes a grid 22$b$ and a filament 23$b$, and, at a position of distance L2 from the ion source 21$b$, a collector 24$b$ as the second collector is disposed. An ion beam 25 output from the ion source 21$b$ is input to the collector 24$b$.

Meanwhile, FIG. 2A is a conceptual view showing the principle of the invention, in the same manner as FIG. 1A. Accordingly, in the same region (in an region of the same vacuum degree and the same temperature), the collectors 24$a$ and 24$b$ may be disposed on the same flying axis of ions (in this case, a single ion source functions as the ion source 21$a$ and the ion source 21$b$), or, as shown in FIG. 2A, the collectors 24$a$ and 24$b$ may be disposed on different flying axes of ions. However, in the latter case, "calibration without decay" to be described later is preferably performed.

Figure 2B:
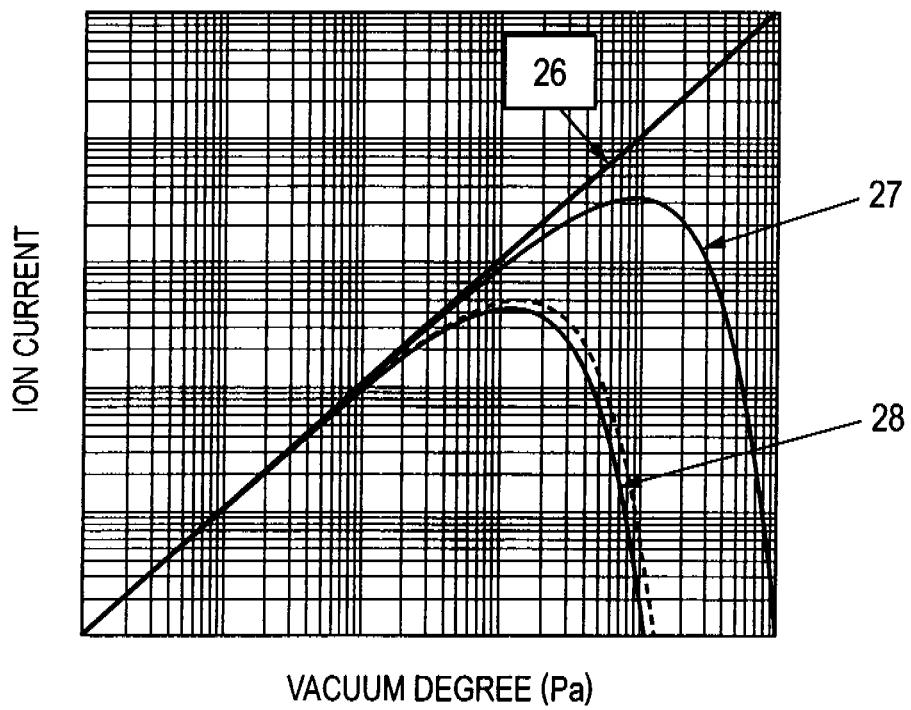
FIG. 2B is a drawing showing the fundamental principle of the invention.

In FIG. 2B, a reference numeral 26 denotes a graph showing the relation between the ion current of an ion source before the decay, that is, with an assumption of no collision, and the vacuum degree, a reference numeral 27 denotes a graph showing the relation between the ion current after the decay when the flight distance is short (an ion current detected by the collector 24$a$) and the vacuum degree, and a reference numeral 28 denotes a graph showing the relation between the ion current after the decay when the flight distance is long (an ion current detected by the collector 24$b$) and the vacuum degree.

As described above, even when an ion source depends on the vacuum degree, in Formulae (3) and (4), the denominator in the natural logarithm is $I_0$ and, at the same time, $I_{L1}$ and $I_{L2}$ being the numerator are proportional to $I_0$, and, therefore, even if $I_0$ has dependency on the vacuum degree, there is no concern. Moreover, in Formula (5), $I_0$ has disappeared originally. Consequently, even when an ion source having the vacuum degree dependency is used, as calculation formulae, Formulae (3), (4) and (5) can be used directly.

4) An Ion Source Having the Vacuum Degree Dependency

Since ion sources 21$a$ and 21$b$ shown in FIG. 2A, which have the vacuum degree dependency, are general, these are explained. The ion source 21$a$ is cylindrical and includes the grid 22$a$ in a shape allowing electrons to penetrate such as a lattice-like shape and the filament 23$a$ emitting thermal electrons with heating. A voltage of +100 V is applied to the grid 22$a$, and about +30 V to the filament 23$a$. Electrons emitted from the filament 23$a$ proceed toward the grid 22$a$, and most electrons intrude into the inside of the grid 22$a$ and, there, collide with the atmosphere gas to generate ions of a plus charge. Since ions are generated substantially at the potential of the grid 22$a$ (+100 V), they are to proceed toward the collector 24$a$ of the earth potential, and a current flowing to the collector 24$a$ is the generated ion number (an ion current). Meanwhile, the ion source 21$b$ is the same.

Figure 3:
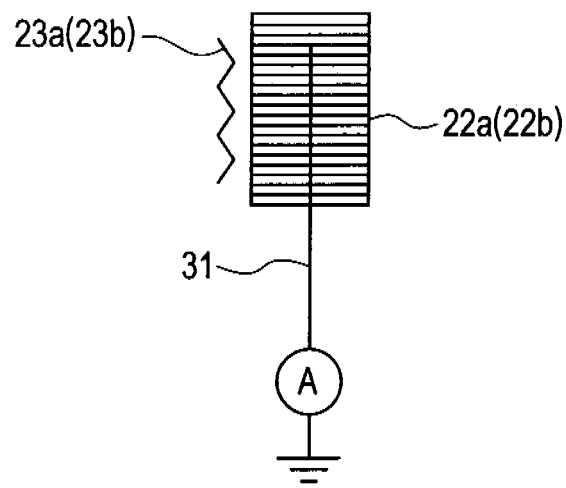
FIG. 3 is a drawing showing the fundamental configuration of the invention.

In order to obtain the ion number $I_0$ before the flying, a collector (an internal collector) is inserted into the grids 22$a$ and 22$b$ to measure the ion current. This structure is the same as an ion gauge well known as a B-A gauge. FIG. 3 is a drawing for explaining the measurement of the ion number $I_0$ (the ion current) before the decay (of the ion source). As shown in FIG. 3, by inserting an internal collector 31 into the grid 22$a$ (22$b$), making the filament 23$a$ (23$b$) emit electrons to generate ions, and measuring the ions by the internal collector 31, the ion number $I_0$ can be obtained.

In order to obtain ion numbers $I_{L1}$ and $I_{L2}$ after the flying, the ion current is measured by disposing a collector (an external collector) at a position separated from the grids 22$a$ and 22$b$ by a certain distance. Such a structure leads to the structure shown in FIG. 2A.

5) A First Method for Obtaining the Mean Free Path

A method for obtaining the mean free path using an ion source having vacuum degree dependency is shown. However, for simplicity, it is assumed that following three points are satisfied.

α: ion sources utilized for the measurement are located in regions of the same vacuum degree and of the same temperature.

β: ion sources utilized for the measurement generate the same number of ions.

γ: ion detection efficiencies of respective collectors (detectors) are equivalent.

Figure 4:
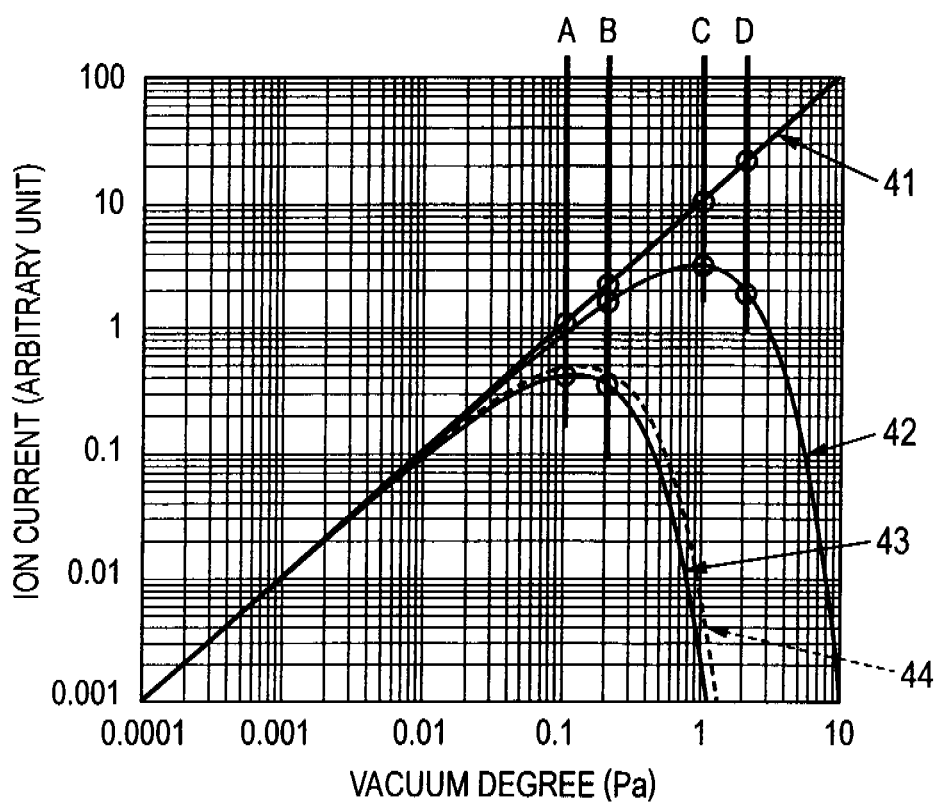
FIG. 4 is a drawing showing the fundamental measurement procedure of the invention.

FIG. 4 shows the same graph as in FIG. 2B, but specific numerals are shown. In FIG. 4, the horizontal axis represents the vacuum degree, which is shown in Pa (about 100,000 Pa is the atmosphere pressure). The vertical axis represents the ion current and is shown in an arbitrary unit.

Further, in the case of FIG. 4, in FIG. 2A, the short flight distance L1 is 8 mm and the long flight distance L2 is 60 mm, ion currents decayed by respective flyings are shown. The ion current before the decay is shown by a straight line. As a gas, $N_2$ is used.

That is, in FIG. 4, a reference numeral 41 denotes a graph showing the relation between an ion current detected before the decay, that is, by the internal collector 31 of the ion source and the vacuum degree. A reference numeral 42 denotes a graph showing the relation between an ion current after the decay and when the flight distance L1=8 mm (an ion current detected by the collector 24$a$) and the vacuum degree. Further, a reference numeral 43 denotes a graph showing the relation between an ion current after the decay and when the flight distance L2=60 mm (an ion current detected by the collector 24$b$) and the vacuum degree.

In FIG. 4, the vacuum degree is assumed to be on a line A (0.1 Pa). The ion current at the vacuum degree is, from FIG. 4, 1.1 (in arbitrary unit, hereinafter the same) by the internal collector 31 before the decay, and 0.4 by the collector 24$b$ after the decay due to the flying of ions by 60 mm. Substitution of these in Formula (4) gives $$\lambda = -60/\ln(0.4/1.1) = 60$$

and the mean free path is calculated at 60 mm (in this case, since the mean free path and the flight distance are just the same, the ion current decays to 1/e: 0.37 times).

Further, in FIG. 4, the vacuum degree is assumed to be on a line B (0.2 Pa). The ion current at the vacuum degree is, from FIG. 4, 2.4 by the internal collector 31 before the decay, and 0.33 by the collector 24b after the decay due to the flying of ions by 60 mm. Substitution of these in Formula (4) gives $$\lambda = -60/\ln(0.33/2.4) = 30$$

and the mean free path is calculated at 30 mm.

On the other hand, in FIG. 4, when the vacuum degree is assumed to be on a line C (1 Pa), since the decay due to the flight distance 60 mm is large and an error may occur in the measurement, the value at the flight distance 8 mm is used. The ion current at the vacuum degree is, from FIG. 4, 12 by the internal collector 31 before the decay, and 3.3 by the collector 24a after the decay due to the flying of ions by 8 mm. Substitution of these in Formula (4) gives $$\lambda = -8/\ln(3.3/12) = 6$$

and the mean free path is calculated at 6 mm.

Furthermore, in FIG. 4, the vacuum degree is assumed to be on a line D (2 Pa). The ion current at the vacuum degree is, from FIG. 4, 25 by the internal collector 31 before the decay, and 1.8 by the collector 24a after the decay due to the flying of ions by 6 mm. Substitution of these in Formula (4) gives $$\lambda = -8/\ln(1.8/25) = 3$$

and the mean free path is calculated at 3 mm.

6) A Second Method for Obtaining the Mean Free Path

In above calculations, values at the flight distance zero are set to be values before the decay, but, while paying attention to the decay due to the flying between the collector 24a and the collector 24b, it is also possible to set the value by the collector 24a as the value before the decay, and the value by the collector 24b as the value after the decay. In this case, since no influence such as a drawing efficiency from the ion source is included, higher precision is given. This corresponds to Formula (5).

In FIG. 4, when the vacuum degree is assumed to be on the line B (0.2 Pa), from FIG. 4, since the ion current is 1.8 by the collector 24a, and 0.33 by the collector 24b, from Formula (5)

$$\lambda = (60-8)/\ln(0.33/1.8) = 30$$

and the mean free path is calculated at 30 mm.

Meanwhile, a dotted line 44 in FIG. 4 is a decay curve at a flight distance of 52 mm, and the use of this and Formula (3) gives the same value (equivalent mathematically).

7) Mean Free Path, Gas Number Density and Pressure

The three, the mean free path, the gas number density and the pressure, showing the vacuum degree can be converted by formulae below.

Gas number density: $n = K1 \cdot 1/(d^2 \cdot \lambda)$ (6)

Pressure: $P = K2 \cdot n \cdot T = K3 \cdot T/(d^2 \cdot \lambda)$ (7)

Where $\lambda$ represents a mean free path (m), d; a molecular diameter (m) of a main component, T; temperature (absolute temperature: K), and the unit of P (pressure) is Pa (1 N/m²). Regarding constants, $K1 = 1/(\sqrt{2} \cdot \pi) = 0.225$, $K2 = 1.38 \times 10^{-23}$ J/K (Boltzmann constant), and $K3 = K1 \cdot K2$.

That is, in order to convert from the mean free path to the gas number density, the molecular diameter is necessary, and the kind of the gas must be known. In the case of a mixed gas, calculation for every gas is required. Moreover, in order to be converted to the pressure, temperature is necessary in addition.

Meanwhile, since the molecular diameter should be a value connected with the collision (an effective diameter), strictly speaking, the mean free path between neutral molecules themselves differs from that between an ion and a neutral molecule, and the mean free path also changes according to the kinetic energy (velocity) of an ion, but, practically, they may be considered to be the same. However, since the electron to be described later has a considerably different effective diameter, the mean free path of electrons becomes 5.6 times.

8) A Composite Type Ion Source

If one ion source can function as both an ion source for measuring ions of zero flight distance (B-A gauge) and an output of ions to be detected by an external collector, among the above-mentioned assumptions, not only the requirement "α: ion sources utilized for the measurement are located in regions of the same vacuum degree and of the same temperature" is surely satisfied, but also the requirement "β: ion sources utilized for the measurement generate the same number of ions" is substantially satisfied. Economical, operational and size merits are also large.

As such an ion source, a composite type ion source disclosed in Patent Document 3 adapts. The composite type ion source is the same as ordinary B-A gauges in a basic structure, and includes a filament for emitting thermal electrons, a grid for drawing in electrons to generate ions inside, and a collector into which the generated ions flow. However, in ordinary B-A gauges, the length of the collector is set to be substantially equal (not less than 4/5) to the length of the grid (the length in the axial direction), but, in the composite type ion source, the length of the collector is set to be shorter than the length of the grid, preferably one half. These (collector length) structures in ordinary B-A gauges aim at collecting as many ions as possible generated in the grid, but are not indispensable as characteristics of vacuum gauges. And, in the composite type ion source having a collector of one-half, too, sufficient practical performance as a vacuum gauge can be secured, although the sensitivity (a converted value) is about one-half.

On the other hand, as an ion source (that is, a device for drawing out and utilizing ions), too, the composite type ion source secures sufficient practical performance. And, ion sources having completely no collector (called a B-A type ion source) are general, and, as compared with those, it has been confirmed that the composite type ion source functions sufficiently as an ion source regarding performances (ion quantity etc.) as an ion source.

The reason is that the length of the filament is substantially the same as the length of the grid (the length in the axial direction) and electrons enter the inside of the grid in substantially uniform quantities in the whole of the axial direction to generate ions substantially uniformly in the whole axial direction. And, when the length of the collector is substantially equal to the length of the grid, almost all quantities of the generated ions flow into the collector. On the other hand, when the length of the collector is only half of the grid length, only substantially half ions are collected to the collector, and other ions are discharged to the outside of the grid in the axial direction.

It is confirmed that the composite type ion source has the performance substantially the same as conventional ones, except that the sensitivity as a vacuum gauge (a converted value) is half of conventional ones, and that it functions sufficiently as an ion source.

Further, since ions of substantially the same quantity as the quantity of ions measured by the internal collector are emitted outside as a beam, the ion current $I_0$ before the decay can be measured by the internal collector. However, strictly not the same quantity, and the difference is desirably corrected by the "calibration without decay" to be described later.

Meanwhile, in the first to third embodiments (FIGS. 5 to 7), the composite type ion source is adopted.

9) To Make the First Collector (Collectors 12a, 24a Etc.) Permeable

In the measuring method, indispensably two or more collectors (detectors) are necessary, but it is impractical to prepare an ion source (an ion beam) for each of them. In order to solve the problem, it is sufficient to place two collectors in series for one ion source (ion beam) (to dispose two collectors on the same flying axis of ions), and to detect a part of ions by the first collector nearer to the ion source, but to allow remaining ions to pass through directly to proceed toward the second collector located at a position farther than the first collector. For example, to the first collector, a structure of mesh-like, slit-like or with at least one small window is given. Alternately, the first collector may be an electroconductive member having been formed into a thin film (for example, a silicon thin film). Under a prescribed condition, when charged particles enter an electroconductive thin film, a part of the charged particles are captured by the electroconductive thin film and the other part thereof permeate the film directly. As described above, in the invention, as the permeable type first collector, any member may be used only if the member can detect a part of entering charged particles and let the other part thereof to permeate the member. And, in order to calculate the mean free path, the original current is calibrated on the basis of the detection ratio of ions by the first collector.

Consequently, since the decay due to different flight distances can be known while using the same ion beam, not only from economical and size viewpoints but also from performance viewpoint, remarkable improvement can be expected. In other words, even if the properties of the ion beam (such as intensity and ion species) change, the change is totally unrelated because it influences on both collectors in the same manner.

For the calculation of the mean free path, although it is necessary that the detection efficiencies of two collectors are equal (the assumption γ), but it is also possible to obtain previously respective detection efficiencies and to calibrate the measured values using these efficiencies. Actually, when the ratio between ion currents of both collectors in the case where the vacuum degree is sufficiently superior (no decay occurs) is obtained previously, since these work as respective original detection efficiencies, it becomes effective to divide the measured value by this value. For example, such a configuration is assumed that 40% of ions are measured at the first collector and the remaining 60% of ions permeate directly to reach the second collector to be measured there. In this configuration, the ratio between ion currents of the first collector and the second collector when no decay (no collision with the atmosphere gas) exists is naturally 4 to 6. In the configuration, if the ion current ratio becomes 8 to 2 when the decay exists, $I_{L1}$ to $I_{L2}$ may be calculated as 2 (=8÷4) to 0.33 (=2÷6). Generally, when the case without the decay leads to a to b and the case with the decay leads to d to e, $I_{L1}$ to $I_{L2}$ is (d/a) to (e/b).

This can substantially satisfy the above-mentioned requirements, "β: ion sources utilized for the measurement generate the same number of ions" and "γ: ion detection efficiencies of respective collectors are equivalent". Meanwhile, although the ion current ratio without the decay may be estimated from design data such as the permeability coefficient of a mesh (or the area ratio of a small window), it may be determined more accurately by actual measurement (calibration without the decay in the next item).

In the first to eighth embodiment (FIGS. 5 to 7, 9 to 11, 13 to 15), a permeable type first collector is adopted.

10) Calibration without the Decay

In order to realize a higher accuracy, not only the calibration of the ratio of physical ion detection at the permeable type first collector in the item 9) but also the calibration of an electric detection ratio (the difference in amplification factors of two measurement circuits) is necessary. Furthermore, when $I_0$ (the value of the internal collector) is to be used, the ratio calibration of the internal and external collectors is indispensable. In particular, in circumstances where the contamination is remarkable, the change of the permeability coefficient of an opening (for example, mesh) of the permeable type first collector is feared.

However, all these factors can easily be calibrated by a method below. First, ion currents by respective collectors are measured in a state of a superior vacuum degree where the decay can be neglected, and the value is previously set as the initial value (the value without the decay). Then, in actual measurements, calculation is performed after normalizing respective actually measured ion currents to values obtained by dividing the ion currents by the initial value. In the same manner as the item 9), when a to b without the decay and d to e with the decay, $I_{L1}$ to $I_{L2}$ is (d/a) to (e/b).

The process for obtaining the initial value shall be called "calibration without the decay". In other words, the calibration without the decay is to calibrate the ratio of numbers of charged particles detected at the first collector and the second collector in a state of a second vacuum degree (for example, a state of a vacuum degree more inferior to a first vacuum degree) by the ratio of numbers of charged particles detected by the first collector and the second collector in a state of the first vacuum degree (for example, a state of a superior vacuum degree).

Regarding the vacuum degree necessary for the calibration without the decay, a state where the decay becomes generally not more than 1/10 is required. That is, when the flight distance is 60 mm, not more than 0.005 Pa (according to FIG. 4, it is known that, at 0.005 Pa, the graph after the decay of L=60 mm and the graph before the decay of L=0 mm (in FIG. 4, the reference numeral 41) substantially coincide with each other, and that little decay exists) is necessary, but, in a sputtering method, since a state of a superior vacuum degree is necessarily set once, and then gas is introduced and the process is started, it is also possible to set so that the calibration without the decay is to be automatically performed every cycle.

11) Range of the Vacuum Degree

From the viewpoint of a reading error, desirably the ratio between ion currents at two flight distances is generally not less than 1.2 times and not more than 100 times in a range of the vacuum degree in which a measurement is to be performed, in other words, the difference in two flight distances is about from 0.2 times to 4 times the mean free path (the value of about 0.2 times and 4 times are calculated from $\ln(I_{L1}/I_{L2})=(L2-L1)/\lambda$, and ln 1.2=0.18<0.2 and ln 100=4.6>4). For example, when flight distances are 8 mm of the first flight distance and 60 mm of the second flight distance by the first and second collectors, the difference in two flight distances is 52 mm. Then, since desirably the 52 mm (difference in flight distances) falls within about from 0.2 times to 4 times the mean free path, the applicable range of the vacuum degree is a range giving the mean free path of 5 times (inverse time of 0.2) to 0.25 times (inverse time of 4) the 52 mm, that is, the mean free path of from 260 mm to 13 mm. In pressure representation, this is from 0.03 Pa to 0.5 Pa.

When the internal collector (flight distance 0 mm) and the first collector (flight distance 8 mm) are used, the difference in the flight distance is 8 mm, and, in the same manner as above, the vacuum degree giving the mean free path of from 5 times to 0.25 times, that is, from 40 mm to 2 mm, is an applicable range. In pressure representation, this is from 0.15 Pa to 3 Pa.

12) Vacuum Gauge Calibration

In the above item 11), the range shown by the range of the vacuum degree is a range when the mean free path is measured directly, but a combined use with the ion gauge function in the composite type ion source may furthermore broaden the range of the vacuum degree. That is, extremely accurate measurement of the vacuum degree becomes possible in the measurement range of usual ion gauges, that is, in a broad range such as from 1 Pa to about $10^{-8}$ Pa. As shown in the above item 8), the composite type ion source has the same function/performance as ion gauges (B-A gauges) being conventional vacuum gauges, except that the composite type ion source has sensitivity (a converted value) of one-half. However, originally, ion gauges (B-A gauges) have such an excellent performance as retaining linearity over a wide range of several orders or more, but, on the other hand, have such a defect that the sensitivity (a converted value), that is, the absolute value of the signal quantity is liable to change. The right 45-degree line of a graph 41 showing "the ion current before the decay (ion source)" in FIG. 4 corresponds to the vacuum degree representation of the ion gauge, wherein "the linearity is superior" means that the line is straight and "the sensitivity (a converted value) is liable to change" means that the vertical position of the whole line is liable to shift (since FIG. 4 shows a double logarithmic graph, the vertical position shifts, but in ordinary graphs, "the linearity changes" means that the gradient changes).

However, in the method according to the invention, although the measurement range itself is narrow, the vacuum degree obtained is very accurate, and, therefore, it is possible to clear the converted value being the correct sensitivity (a converted value) of the ion gauge while comparing it with the value of the ion gauge measured simultaneously. In other words, the vertical position of the whole line can be reset correctly. The process of calibrating the sensitivity (a converted value) of another vacuum gauge (a gauge) shall be called "vacuum gauge calibration".

Meanwhile, ordinary vacuum degree calibration is performed under a state where a vacuum degree the value of which is accurately known has been realized. For example, it is assumed that first the vacuum degree is set to be accurately α (Pa) by another reliable means and then the signal (an ion current in an ion gauge) of a vacuum gauge to be calibrated is measured to give β (μA), and the sensitivity (a converted value) of the vacuum gauge is determined to be "α/β (Pa/μA)". Afterward, under such assumption that the sensitivity (a converted value) does not change, X μA measured with the vacuum gauge shall be set to be X·α/β (Pa). However, it is very difficult to prepare the "reliable another means" capable of guaranteeing initial α (Pa), and the means itself is required to be calibrated with furthermore other more reliable means.

In contrast, in the vacuum gauge calibration according to the invention, the vacuum degree is unnecessary to be known, and any vacuum degree is allowable only if it is included in a range in which the decay occurs. However, the kind of gas must be known. In other words, when the vacuum degree falls within the range shown by the range of the vacuum degree in the item 11), the mean free path can be calculated accurately, and, therefore, the value may be used for the calibration. For example, when it is assumed that the vacuum degree is unknown but the introduction of $N_2$ has resulted in the mean free path of 60 mm, the pressure can be decided to be 1 Pa. Accordingly, it is sufficient to adjust an adjustment means so that the display of another vacuum gauge to be calibrated displays 1 (Pa). On this occasion, the accuracy of the flight distance is required, but it can be realized easily. Afterward, the calibration is performed in the same manner as ordinary calibrations.

As described above, the calibration by the invention do not require a special device, and, in addition, can be performed in a short time. Consequently, it is also possible to set the vacuum gauge calibration to be automatically performed in an actual measurement. That is, in most processes such as sputtering, the vacuum degree at which the decay occurs by a predetermined gas is utilized, and the calibration is performed at the time.

13) Utilization of Electrons

As charged particles to be decayed, not only ions but also electrons can be utilized. Since electrons have a small diameter to give the mean free path of about 5.6 times that of ions, when the flight distance is the same, electrons can be applied to the measurement of a vacuum degree five times superior to the case of ions. The most general method for generating electrons is a thermal filament system, but, as other electron sources, any may be used such as an indirectly heated oxide and a field emission type, only if the method can generate electrons. In the sixth to tenth embodiments (FIGS. 11, 13 to 16), electrons are utilized.

14) Measures Against Stray Ions and Stray Electrons

An ion or electron having collided with an atmosphere gas (a neutral molecule) does not disappear, but simply loses the kinetic energy to remain and float as a stray ion or a stray electron in the flying space.

Consequently, when stray charged particles such as stray ions and stray electrons are not eliminated quickly, they reach the collector and can cause an error in the measurement of quantity of charged particles. One of measures against this is a mechanical one, and a measurement is performed such as not allowing charged particles irrelevant to the measurement to enter the flying region, inhibiting charged particles having lost energy in front of the collector, or disposing a plate of the earth potential (or a slightly minus potential) near the flying region to absorb stray charged particles. The mechanical method is adopted in the second, and fourth to eighth embodiments (FIGS. 5, 9, 10, 11 and 13).

Another measure is an electric one, and performs the measurement of an ion current (an electron current) using a lock-in (a modulation synchronization type) amplifier, instead of an ordinary direct current (DC). Since the generation of ions (electrons) is subjected to modulation (intermittence) and only alternating-current components having been synchronized with it are detected with the lock-in (the modulation synchronization type) amplifier, only ions (electrons) having not collided with an atmosphere gas can be detected (the detail is explained in the third embodiment). The lock-in (the modulation synchronization type) amplifier system is effective in such cases that the absorbing plate can not be disposed and a certain interfering current intrudes in addition to collided ions (electrons). The electric method is adopted in the third, ninth and tenth embodiments (FIGS. 7, 8, 15 and 16).

15) Factors that Deteriorate Precision

Factors that deteriorate the precision are the presence of "the vacuum degree dependency other than the flight distance", and the possibility and a measure are considered as follows.

[1] The variation of the ion drawing efficiency is possible, and the use of Formula (5), etc. is a measure.

[2] The variation of an ion opening angle is possible, and to restrict the detection angle by setting an aperture or using a collector smaller than an ion beam is a measure. This is adopted in the second, third and fourth to ninth embodiments (FIGS. 6, 7, 9 to 11, and 13 to 15).

[3] In addition to the collision with a molecule, factors such as Coulomb force divergence of ions (a space charge effect) and drawing of neutral molecules are possible, and, against these, to reduce the ion current or to heighten the energy of ions (to a degree that does not generate ionization) is a measure.

16) Regarding a Control Part

A device 1007 for measuring a mean free path, which is explained in respective embodiments described later, can incorporate a control part 1000 shown in FIG. 16. And, the control part may be connected via an interface.

FIG. 16 is a block diagram showing a schematic configuration of a control system according to one embodiment of the invention.

In FIG. 16, the reference numeral 1000 denotes the control part as a control means for controlling the whole of the device 1007. The control part 1000 has a CPU 1001 for executing processing operations such as various calculations, controls and discriminations, and a ROM 1002 for storing various control programs etc. to be executed by the CPU 1001. And, the control part 1000 has a RAM 1003 for temporarily storing data during the processing operation of the CPU 1001 and input data, and an nonvolatile memory 1004 such as a flash memory and SRAM, etc.

Further, to the control part 1000, an input operation part 1005 including a key board or various switches inputting a prescribed command or data, and a display part 1006 (for example, a display) performing various displays including the input/setting state of the device 1007 are connected.

A First Embodiment

Figure 5:
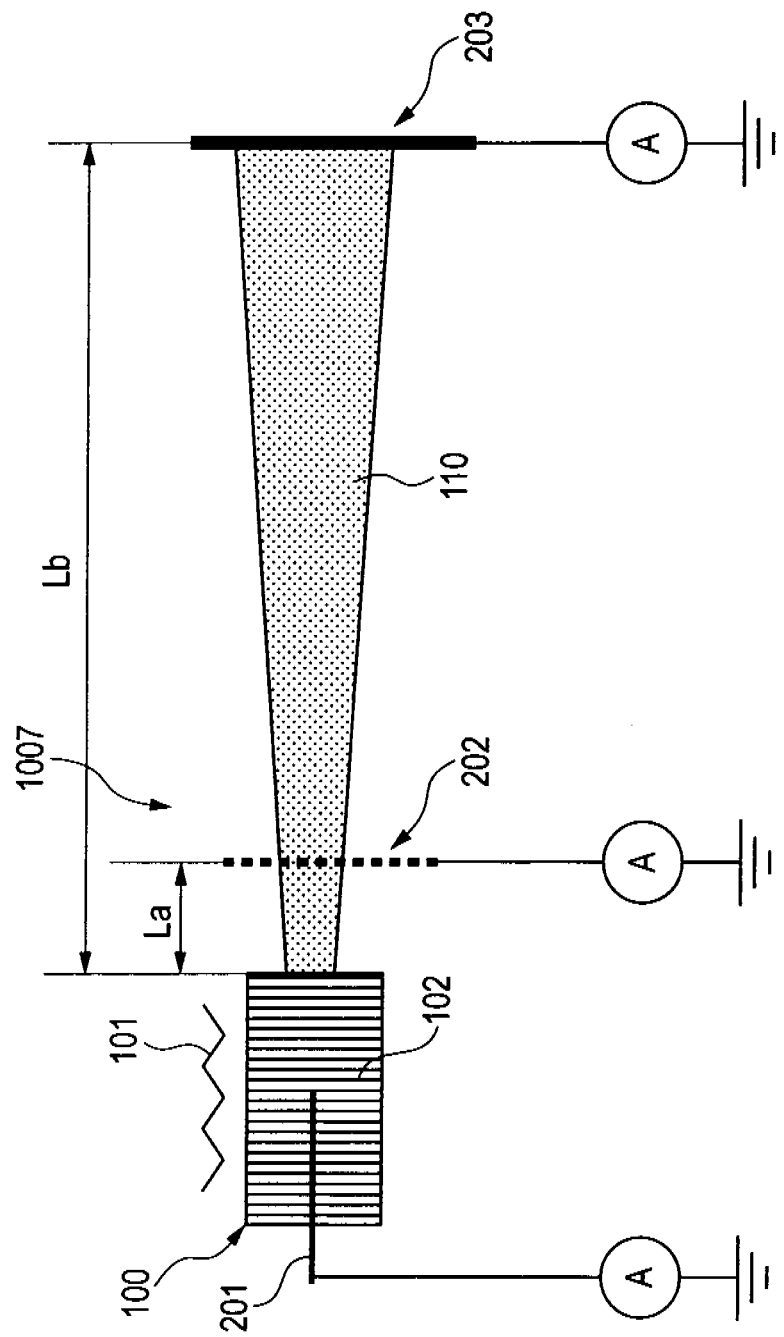
FIG. 5 is a drawing showing a device for measuring a mean free path according to a first embodiment of the invention.

FIG. 5 is a drawing showing the device 1007 for measuring a mean free path according to the first embodiment of the invention, in which a composite type ion source and a permeable type collector are used. The whole of the device 1007 shown in FIG. 5 is disposed in an atmosphere gas to be measured. However, the ammeter shown in the drawing is schematic, and, actually, is arranged outside the atmosphere gas. Moreover, although not shown in the drawing, respective electrodes are attached/fixed by a method well known as a vacuum gauge, and a connected wiring is conducted to the air side. For example, respective electrodes are screwed to an insulating stone (ceramic etc.), and an electrically welded wiring (a nickel wire etc.) extends up to the control device on the air side via a glass-sealed introduction terminal.

In FIG. 5, the device 1007 for measuring a mean free path as a vacuum gauge includes a composite type ion source 100, a permeable type collector 202, and a collector 203. The collectors 202 and 203 are disposed on an ion flying axis of an ion 110 output from the ion source 100. And, the collector 202 is provided so that the distance from the ion emission surface of the ion source 100 to the ion detecting surface of the collector 202 is La. Accordingly, the collector 202 detects ions of the flight distance La from the ion source 100. And, the collector 203 is provided so that the distance from the ion emission surface of the ion source 100 to the ion detection surface of the collector 203 is Lb. Accordingly, the collector 203 detects ions of the flight distance Lb from the ion source 100.

The composite type ion source 100 has a grid 102 in a cylinder ($\phi$ of about 10 mm, length of about 30 mm) and in a shape allowing electrons to permeate such as a grid-like shape (grid intervals of 3 mm, permeability coefficient of about 95%), a filament 101 made of a tungsten wire having $\phi$ of about 0.2 mm and emits thermal electrons when heated to 1800 degrees or higher, and an internal collector 201 made of a tungsten wire having $\phi$ of about 0.1 mm.

To the grid 102, a voltage of about +100 V is applied, and to the filament 101, a voltage of about +30 V is applied, and the internal collector 201 is set to be the earth potential (grounding/ground voltage. Specifically, 0 V, which is the base potential of the whole vacuum gauge). Electrons emitted from the filament 101 proceed toward the grid 102, and most of electrons intrude into the inside of the grid 102, and, there, collide with the atmosphere gas to generate the ion 110 of a positive charge. Since the ions 110 are generated at substantially the potential of the grid 102 (+100 V), a part of the ions flow into the internal collector 201 of the earth potential. As described above, the internal collector 201 detects an ion number $I_c$ being the ion number before the decay. But, since the length of the internal collector 201 is about one-half of the axial direction distance of the grid 102, and the other end (the side opposite to the collectors 202 and 203) of the grid 102 is left open, other ions 110 having not flown into the internal collector 201 are discharged outside the ion source 100 and proceed toward the collector 202 of the earth potential. The ion 110 having collided with the atmosphere gas (a neutral molecule) in the flying up to the collector 202 loses the kinetic energy and does not reach the collector 202, but a part of the ions 110 do not collide and reach the collector 202 to be measured as the ion current. That is, the collector 202 detects the ion number $I_a$ having decayed after the flying by the flight distance L1.

Since the collector 202 is of a permeable type formed in a mesh shape, a furthermore part of the ions 110 having reached the position of the collector 202 proceed directly toward the collector 203. The ions 110 having collided with the atmosphere gas also between the collector 202 and the collector 203 do not reach the collector 203, but a part of the ions 110 do not collide and reach the collector 203 to be measured as the ion current.

That is, the collector 203 detects the ion number $I_b$ having decayed after the flying by the flight distance L2.

The collector 202 has mesh intervals of about 0.3 mm and a permeability coefficient of about 50%. A mesh shape made of SUS etc. is suitable. The collector 203 is a simple metal plate made of such as SUS.

The flight distance must be selected corresponding to an applied vacuum degree, and, in the embodiment, so that the measurement of the vacuum degree of about 1 Pa is possible, the distance La between the ion source 100 and the collector 202 is set to be 8 mm, and the distance Lb between the ion source 100 and the collector 203 is set to be 60 mm. Since an error in the distance becomes directly an error of the measurement result, it is important that the distance is accurate and does not change over a long period. Meanwhile, in the embodiment, values of the distance La and the distance Lb are stored in a nonvolatile memory 1004. Accordingly, the nonvolatile memory 1004 retains that the distance La is 8 mm and the distance Lb is 60 mm. Furthermore, since the internal collector 201 is provided inside the ion source 100, the distance Lc between the ion source 100 and the internal collector 201 is zero.

Accordingly, the nonvolatile memory 1004 also stores the value of the distance Lc (=0 mm).

The ion current and the ion beam diameter do not directly relate to the measurement result and are arbitrary, but, generally, the ion current is set to be about 1 $\mu$A ($10^{-6}$ A), the ion energy is set to be about 100 eV, and the ion beam diameter is set to be about several mm. The current measurement is an ordinary direct-current (DC) measurement, and it is sufficient that about from 1 nA ($10^{-9}$ A) to 1 $\mu$A can be detected at a response rate of a little over 0.1 second. However, since it is desired that the internal collector 201 measure up to a vacuum degree superior to the degree of the B-A gauge, desirably it can measure up to 1 pA ($10^{-12}$ A) even if the response is slow.

When a measurement with high precision is necessary, "the calibration without the decay" is performed prior to the calculation. This is to calibrate the detection ratio of the ion 110 at the permeable type collector 202, amplification factors of two measurement circuits, and the ion detection ratio of the internal collector 201, and it is necessary that a state be set where the decay of the vacuum degree of the atmosphere gas is not more than 1/10. In the embodiment, since the flight distance Lb is 60 mm, not more than 0.005 Pa is required (according to FIG. 4, in which the vertical axis represents the ion current and the horizontal axis represents the vacuum degree, at 0.005 Pa, the graph 43 after the ion decay of L=60 mm substantially coincides with the graph 41 before the decay of 0 mm, from which it is known that there is almost no decay even at the flight distance of 60 mm being the mean free path at 0.13 Pa). Conditions other than the vacuum degree are set to be the same in the actual measurement, and the ion current by respective collectors are set to be the initial value without the decay. And, each of actually measured ion currents is normalized to a value obtained by dividing the ion currents by the initial value, to be used for the calculation. In other words, in the measurement for the calibration without the decay, the internal collector 201 detects an ion number $I_c'$, the collector 202 detects an ion number $I_a'$, and the collector 203 detects an ion number $I_b'$. Each of these detected ion number $I_a'$, ion number $I_b'$ and ion number $I_c'$ is memorized in the nonvolatile memory 1004. Accordingly, when performing the calibration without the decay, the control part 1000 suitably reads out the ion number $I_a'$, the ion number $I_b'$ and the ion number $I_c'$ as the initial value stored in the nonvolatile memory 1004, and measured values are normalized to values obtained by dividing the measured values by the read out initial values, respectively, thereby performing the calibration without the decay.

The basic procedure of the measurement of the mean free path is as follows.

First, the filament 101 is heated to be set so that electrons of appropriate values reach the grid (the value is not necessarily known accurately, and not necessarily set to be strictly constant). That is, the control part 1000 controls the device 1007 so that the ion source 100 generates the ion 110.

Next, each of quantities of ions flowing into the internal collector 201, the collector 202, and the collector 203 (the ion number $I_c$, the ion number $I_a$, and the ion number $I_b$) is measured. That is, the control part 1000 controls the device 1007 so as to detect ions by the internal collector 201, the collector 202, and the collector 203, and obtains the detected ion number $I_c$, ion number $I_a$ and ion number $I_b$ from the device 1007 to store these in the RAM 1003.

Finally, the obtained ion number $I_c$, ion number $I_a$ and ion number $I_b$ are suitably used, while using Formulae (3) to (5), to calculate the mean free path. Among these, when the ratio of ion quantities falls within from 1.2 times to 100 times, it is set to be the decided value. In other words, the control part 1000 reads out information corresponding to the formula to be used for calculation of the mean free path and performs the calculation.

For example, when Formula (3) is used for performing the calculation, the internal collector 201 serves as the first collector, and the collector 202 serves as the second collector. And, the ion number $I_c$ becomes the ion number $I_0$, the ion number $I_a$ becomes the ion number $I_{L1}$, and the distance La becomes the flight distance L1. Accordingly, the control part 1000 reads out the distance La from the nonvolatile memory 1004, reads out the ion numbers $I_c$ and $I_a$ from the RAM 1003, and, from the read out values, calculates the mean free path according to Formula (3).

And, when Formula (4) is used to perform the calculation, the collector 201 serves as the first collector, and the collector 203 serves as the second collector. The ion number $I_c$ becomes the ion number $I_0$, the ion number $I_b$ becomes the ion number $I_{L2}$, and the distance Lb becomes the flight distance L2. Accordingly, the control part 1000 reads out the distance Lb from the nonvolatile memory 1004, reads out the ion numbers $I_c$ and $I_b$ from the RAM 1003, and, from the read out values, calculates the mean free path according to Formula (4).

Furthermore, when Formula (5) is used to perform the calculation, there are a pattern A in which the collector 202 serves as the first collector and the collector 203 serves as the second collector, and a pattern B in which the internal collector 201 serves as the first collector and the collector 202 serves as the second collector.

The Case of the Pattern A

The ion number $I_a$ works as the ion number $I_{L1}$, the ion number $I_b$ becomes the ion number $I_{L2}$, the distance La becomes the flight distance L1, and the distance Lb becomes the flight distance L2. Accordingly, the control part 1000 reads out the distances La and Lb from the nonvolatile memory 1004, reads out the ion numbers $I_a$ and $I_b$ from the RAM 1003, and, from the read out values, calculates the mean free path according to Formula (5).

The Case of the Pattern B

The ion number $I_c$ becomes the ion number $I_{L1}$, the ion number $I_a$ becomes the ion number $I_{L2}$, the distance Lc becomes the flight distance L1, and the distance La becomes the flight distance L2. Accordingly, the control part 1000 reads out the distances Lc and La from the nonvolatile memory 1004, reads out the ion numbers $I_c$ and $I_a$ from the RAM 1003, and, from the read out values, calculates the mean free path according to Formula (5).

As described above, while corresponding to the Formula to be used, the measured value to be required is determined. Accordingly, the control part 1000 appropriately selects and reads out respective distances and ion numbers, according to the Formula to be used in the calculation (that is, according to the Formula set to be used for the calculation), and performs the calculation. Meanwhile, the setting of Formula to be used can be performed by a user via the input operation part 1005.

The control part 1000 can also perform the calibration without the decay when obtaining the mean free path.

When performing the calibration without the decay, the control part 1000 can suitably read out the ion number $I_a'$, the ion number $I_b'$ and the ion number $I_c'$ as the initial values from the nonvolatile memory 1004, according to the Formula to be used to perform the calibration without the decay using the read out values. For example, when Formula (5) is to be used, the control part 1000 reads out the ion number $I_a'$ and the ion number $I_b'$ from the nonvolatile memory 1004, uses these to perform the normalization of ion number $I_a$/ion number $I_a'$ and ion number $I_b$/ion number $I_b'$ to perform the calibration without the decay.

Meanwhile, the control part 1000 can make the mean free path obtained by the calculation to be displayed on the display part 1006. By the display as described above, a user can know a vacuum degree at that time.

The control part 1000 may also calculate, on the basis of the above-mentioned mean free path obtained, the pressure corresponding to the mean free path from Formula (7). In this case, a thermometer as a means for measuring temperature for measuring the temperature of the measurement region of the device 1007 is incorporated for the device 1007 to measure the temperature of the measurement system of the device 1007. When the gas component is known, the diameter of the molecule is obtained from literature data thereof, and, when the component is not known, it is decided by a mass spectrometer and the diameter of the molecule is obtained from literature data thereof. In other words, the control part 1000 can convert a directly obtained mean free path to pressure, and make the converted pressure to be displayed on the display part 1006. Meanwhile, when the component is not known and no spectrometer is available, the calculation is performed using the diameter of $N_2$ and set to be a pressure value in terms of $N_2$ (the pressure value in terms of $N_2$ is a method broadly utilized in ion gauges).

Meanwhile, in the embodiment, the control part 1000 calculates the mean free path, but an operational device independent from the control part 1000 (for example, such as a computer and a scientific electronic calculator) is also usable. In other words, in the invention, it is important to obtain the mean free path using a ratio, and, for that purpose, the essence is to use at least two collectors having different distances from the ion source, and to obtain the mean free path from any of Formulae (3) to (5) using the ion numbers detected by these collectors. Accordingly, it does not make any difference where the calculation for obtaining the mean free path is to be performed.

In the embodiment, the distances La, Lb and Lc being the distances between the ion source 100 and respective collectors are known. And, the ion numbers $I_a$, $I_b$ and $I_c$ detected by respective collectors are retained in such a storing means as the RAM 1003. Accordingly, when obtaining the mean free path by the control part 1000, the calculation may be performed as described above. That is, the control part 1000 obtains the distances La, Lb and Lc, and the ion numbers $I_a$, $I_b$ and $I_c$ necessary for calculating the mean free path from the storing means to perform the calculation according to any of Formulae (3) to (5).

Moreover, when the calculation is performed with a computer separated from the control part 1000, and when the computer is connected with the control part 1000 via a network, it is sufficient that the control part 1000 transmits the information showing the ion numbers $I_a$, $I_b$ and $I_c$ detected by respective collectors and stored in the RAM 1003, and the information showing the distances La, Lb and Lc stored in the nonvolatile memory 1004. The computer obtains the information by a network interface etc. After that, the computer can use each piece of information obtained to acquire the mean free path while performing the calculation in the same manner as the control part 1000.

When the computer is not connected with the control part 1000 via a network, it is sufficient that the control part 1000 displays the ion numbers $I_a$, $I_b$ and $I_c$ detected by respective collectors and stored in the RAM 1003, and the distances La, Lb and Lc stored in the nonvolatile memory 1004, respectively, on the display part 1006. By the display in the way, a user may input each piece of information displayed to a computer separated from the control part 1000 using an input means such as a keyboard, and make the computer perform any of calculations of Formulae (3) to (5). At this time, the separated computer obtains the distances La, Lb and Lc, and the ion numbers $I_a$, $I_b$ and $I_c$ necessary for calculating the mean free path from the user input by the input means, and performs the calculation of any of Formulae (3) to (5).

Moreover, by the display, a user can perform the calculation of any of Formulae (3) to (5) by a scientific electronic calculator on the basis of the displayed information to acquire the mean free path. In this case, the scientific electronic calculator obtains the distances La, Lb and Lc, and the ion numbers $I_a$, $I_b$ and $I_c$ necessary for calculating the mean free path by the user input by a numeric keypad owned by the scientific electronic calculator, and performs the calculation of any of Formulae (3) to (5).

As described above, in the embodiment, the ion numbers $I_a$, $I_b$ and $I_c$ having detected by respective collectors with the device configuration characteristic of the embodiment shown in FIG. 5 are obtained, and these ion numbers are stored in a storing means. And, by suitably reading out the stored ion numbers to be subjected to an above-mentioned prescribed processing, the calculation of Formulae (3) to (5) can be performed to acquire the mean free path accurately and simply.

Moreover, the embodiment may be so configured that detected ion numbers (ion currents) are displayed on ammeters connected to respective collectors in FIG. 5. In this case, via the input operation part 1005, a user inputs values displayed on the ammeters and flight distances corresponding to the values to the control part 1000, and, furthermore, inputs instructions of the calculation of the mean free path. On the basis of the user input, the control part 1000 obtains the flight distances of ions and the ion numbers, and, according to the instructions of the calculation, performs the calculation of the mean free path according to any of Formulae (3) to (5). Alternately, a user may input the values displayed on the ammeters to a scientific electronic calculator. In this case, the scientific electronic calculator is to obtain the flight distances of ions and the ion number after the decay according to the user input, and the scientific electronic calculator can perform any of Formulae (3) to (5).

In the embodiment, the composite type ion source 100 is used, which has a function of measuring the vacuum degree of broad measurement region as an ion gauge. Therefore, when "vacuum gauge calibration" is performed, in which the mean free path is measured and, at the same time, the vacuum degree is measured based on the ion gauge function to calibrate the sensitivity (the converted value) of the vacuum gauge, extremely accurate vacuum degree measurement can also be performed in the measurement range of the ion gauge, that is, in a broad range about from 1 Pa to $10^{-8}$ Pa. In "the vacuum gauge calibration", while maintaining the vacuum degree at such a level that the decay occurs by a known gas species, the measurement of the mean free path by the above method and the measurement of the vacuum degree (pressure) by the ion gauge function are performed, and the control part 1000 compares the two by Formula (7) to calibrate the sensitivity (the converted value) of the ion gauge function. The vacuum degree when the calibration is performed may be an arbitrary (unknown) value, only if the mean free path can be measured.

As described above, in the embodiment, remarkable simplification is realized by the use of the composite type ion source and the permeable type collector, and measurement with a higher precision and broader range is made possible by "the calibration without the decay" and "the vacuum gauge calibration".

Second Embodiment

Figure 6:
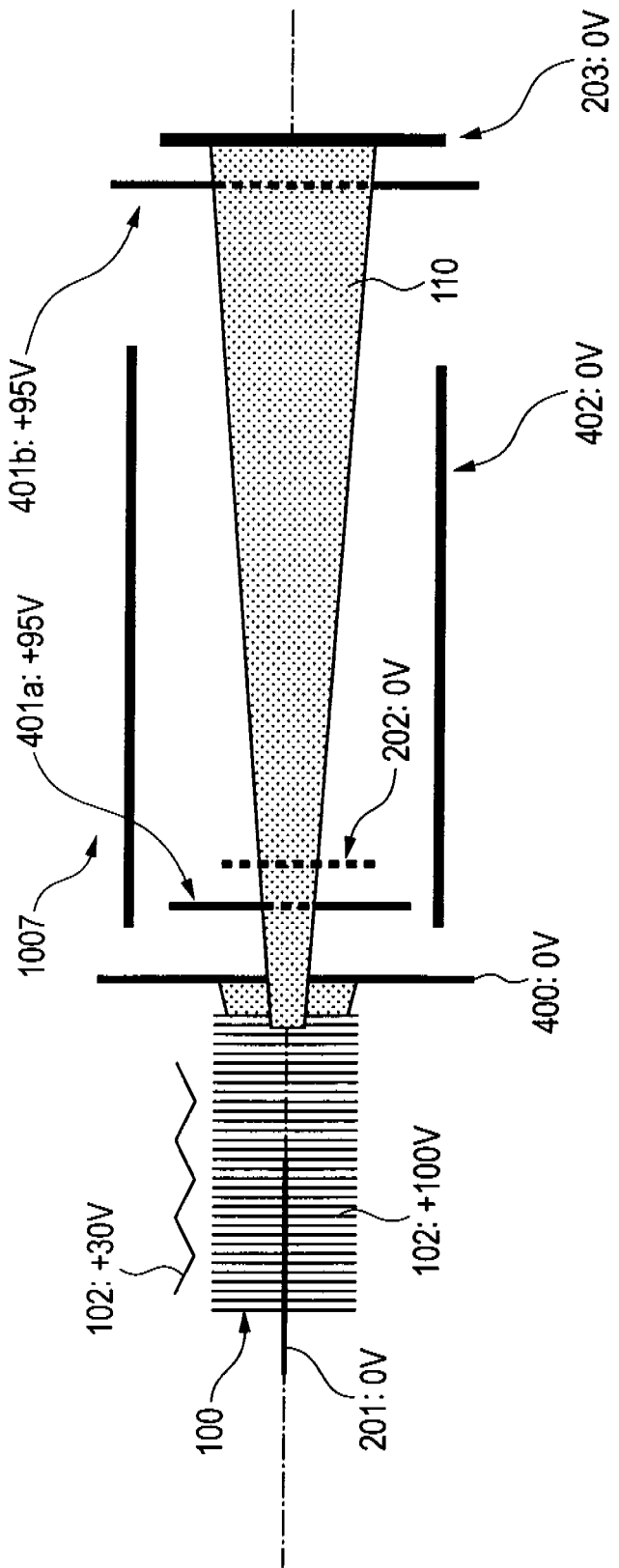
FIG. 6 is a drawing showing a device for measuring a mean free path according to a second embodiment of the invention.

FIG. 6 is a drawing showing a device for measuring a mean free path according to a second embodiment of the invention, in which the composite type ion source and the permeable collector are used, and a measure against stray ions and a measure against precision deterioration due to the ion opening angle are devised. The ion source 100, the collector 202 and the collector 203 are exactly the same as those in the first embodiment, and the measurement procedure, calculation method, range of vacuum degree etc. are also the same. But, in the embodiment, three kinds of electrodes such as a beam angle-restricting plate 400, stray ion-hindering plates 401a and 401b (2 plates) and a stray ion-absorbing plate 402 are newly set up as mechanical measures against stray ions.

The beam angle-restricting plate 400 has a hole (about φ 2 mm) at the central part, and is set up near the ion source 100 (about 2 mm from the edge). The stray ion-hindering plates 401a and 401b have a hole with mesh (mesh intervals are 1 mm, permeability coefficient is about 90%) at the central part. The stray ion-hindering plate 401a is arranged separated about 2 mm from the collector 202 and φ of the hole is about 3 mm. On the other hand, the stray ion-hindering plate 401b is arranged separated about 2 mm from the collector 203, and φ of the hole is about 9 mm. The stray ion-absorbing plate 402 is cylindrical φ is about 10 mm) and is set up coaxially with the beam of the ion 110. The beam angle-restricting plate 400 and the stray ion-absorbing plate 402 are set to be the earth potential (0 V), and both the stray ion-hindering plates 401a and 401b are set to be a potential of +95 V, lower than the voltage of the grid 102 in 5 V.

Three holes of the beam angle-restricting plate 400 and the stray ion-hindering plates 401a and 401b are set so that three of an opening angle subtending the hole of the beam angle-restricting plate 400 from the ion source 100, and opening angles subtending two holes of the stray ion-hindering plates 401a and 401b from the ion source 100 become "the same opening angle". In particular, the opening angle subtending the holes of the stray ion-hindering plates 401a and 401b is important, and, as a result, the opening angles subtending the holes from the ion source 100 of the ion 110 reaching two collectors 202 and 203 become the same. Consequently, the beam of the ion 110 with the opening angle restricted by the beam angle-restricting plate 400 passes through the holes of the stray ion-hindering plates 401a and 401b to reach the collectors 202 and 203, unless it collides with the atmosphere gas.

However, a part of the ion 110 having collided with the atmosphere gas is forced to be curved in the traveling direction and goes out of the opening angle restricted by the beam angle-restricting plate 400, and the travel thereof is blocked and absorbed by the plate-like part (a part without the hole) of the stray ion-hindering plates 401a and 401b. Moreover, another part of the ion 110 having collided with the atmosphere gas does not go out of the opening angle, but, since the kinetic energy is lowered, it can not pass through the mesh part of the stray ion-hindering plates 401a and 401b to which a high voltage (a voltage slightly lower than the voltage of the grid 102) is applied, and, finally, is absorbed by the stray ion-absorbing plate 402. Accordingly, the ion 110 having broadened toward angles of the determined opening angle or more and the ion 110 having lost the initial kinetic energy are blocked, and only the ion 110 having not collided with the atmosphere gas reaches the collector. As described above, in the embodiment, the mechanical measure is performed against stray ions.

Since the deterioration of the precision depending on the opening angle of ions occurs caused by the change of the vacuum degree to change the opening angle of the ion 110 to be drawn out and to affect the ion current value, it is sufficient to set that two collectors 202 and 203 always (even when the vacuum degree changes) catch the same ion bundle. In order to realize this, in the same manner as the above-mentioned measure against the stray ion, three holes (in particular, the holes of two stray ion-hindering plates 401a and 401b) are set to have "the same opening angle".

Meanwhile, the beam angle-restricting plate 400 is not absolutely indispensable. However, by providing the beam angle-restricting plate 400, it is possible to perform an early stage measure against the stray ion in point of not allowing useless ions to enter the flying region of ions, and to perform thoroughly the measure against the factor of the precision deterioration in point of fixing more surely the ion-drawing angle. Moreover, since an electrode of the earth potential is to be set up near the ion source 100, an effect of drawing out stably the ion 110 from the ion source 100, that is, as a drawing electrode can also be expected.

As described above, in the embodiment, the practice of strict measure against stray ions makes significant improvement of the measurement precision possible.

Third Embodiment

Figure 7:
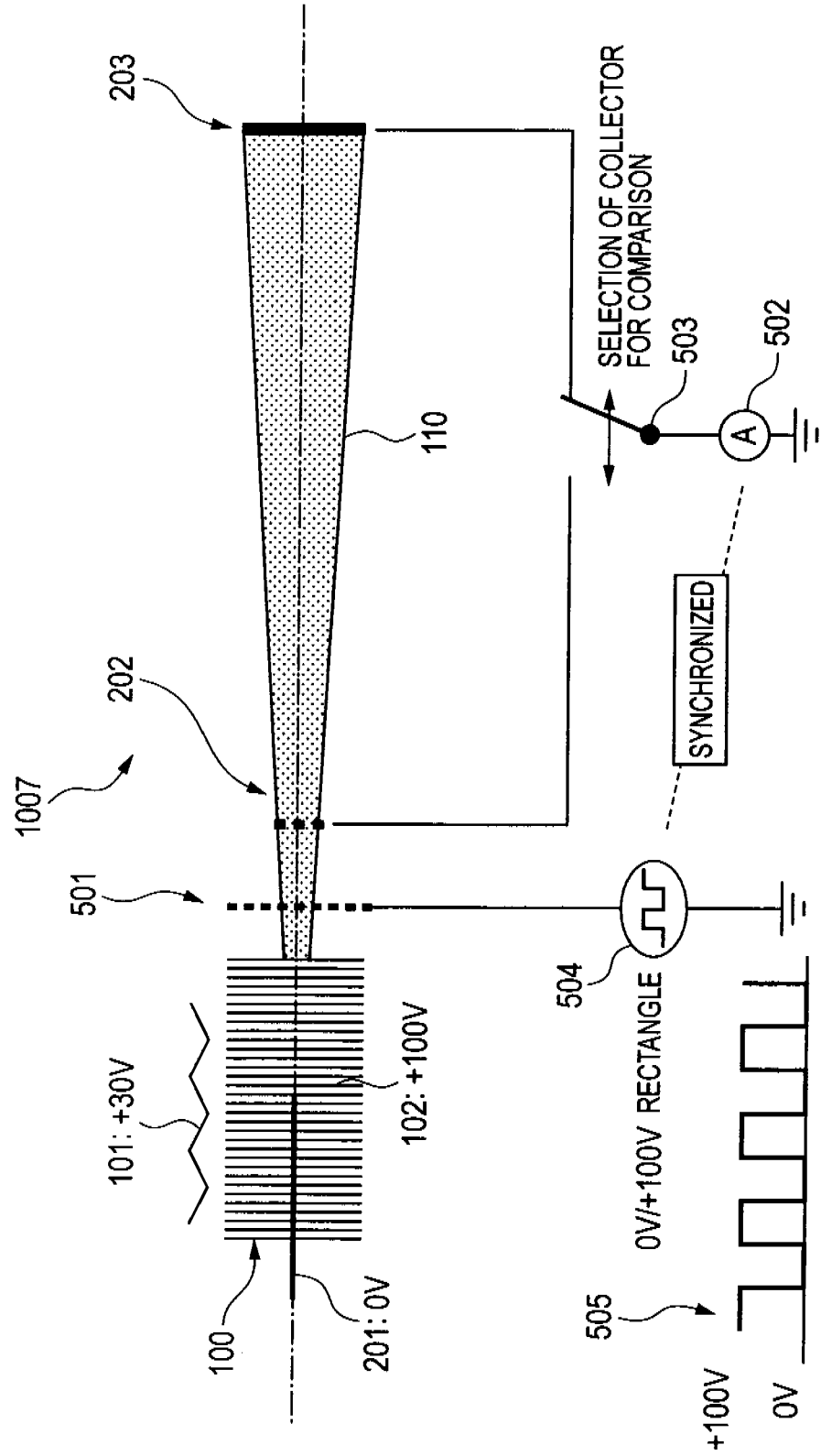
FIG. 7 is a drawing showing a device for measuring a mean free path according to a third embodiment of the invention.

FIG. 7 is a drawing showing a device for measuring a mean free path according to a third embodiment of the invention, in which the composite type ion source and the permeable collector are used, and a measure against the factor of the precision deterioration depending on the opening angle of ions and an electric measure against stray ions are performed. The ion source 100, the collector 202 and the collector 203 are substantially the same as those in the first embodiment, and the measurement procedure, calculation method, range of the vacuum degree etc. are also the same, but the size (detection effective area) of the collector 202 and the collector 203 is specific. Furthermore, as an electric measure against stray ions, an ion blanking is newly set up, and, as an ammeter, a lock-in (a modulation synchronization type) amplifier is used.

For precision deterioration according to the opening angle of ions, it is set so that the detection effective areas of both the collector 202 and collector 203 are made small to make these lie constantly in the beam of the ion 110, and that two detection effective areas measure constantly the same bundle of the ion 110. The measure is fundamentally the same as "the same opening angle" in the second embodiment. But, in the second embodiment, the ion 110 having a certain opening angle or more is blocked with a plate having a hole (the stray ion-hindering plates 401a and 401b), but, in the embodiment, since the size of the collectors 202 and 203 (the detection effective area) is set to coincide with a certain opening angle, the ion 110 having the opening angle or more is made to pass without measurement. Meanwhile, since the collector 202 and the collector 203 are hung with three thin wires (φ is about 0.1 mm), the influence of the ion 110 having the opening angle of not less than the collector can be neglected.

As an electric measure against stray ions, it is set so that, even when stray ions flow in the collectors 202 and 203, they are not to be detected. First, it is set so that an ion blanking 501 is set up near the ion source 100 to emit the ion 110 intermittently. Many blanking methods for making charged particles be intermittent periodically are known, and the embodiment adopts the simplest blocking potential system by mesh. However, in the embodiment, needless to say, any means may be used only if it can emit entered charged particles with intermittent cycles.

In the embodiment, the mesh of an ion blanking 501 has mesh intervals of 1 mm, and permeability coefficient of about 90%, and, to the mesh, a power source 504 is connected electrically to apply a rectangular voltage 505. In other words, to the mesh, potentials of 0 V and 100 V are applied at about 1 MHz ($10^6$ cycle/sec). When the mesh is at 100 V, since the ion 110 can not pass through, the ion 110 is emitted intermittently at about 1 MHz. Accordingly, an ion current having flied at a high speed without colliding with the atmosphere gas to reach the collectors 202 and 203 in not more than 1 μsec ($10^{-6}$ sec) is of a rectangular wave of the same frequency.

However, an ion current having collided with the atmosphere gas to remain and float in a flying region of ions, and then reaching the collectors 202 and 203 after an elapse of not less than 10 μsec ($10^{-5}$ sec) becomes substantially constant. In other words, stray ions give a constant current, and the ion current to be a signal becomes of a rectangular wave overlapped thereon. And, to the lock-in (modulation synchronization type) amplifier 502, a voltage 505 (a synchronizing signal) obtained by dividing the blocking potential is input, a signal intensity of an alternating-current component synchronizing the frequency is to be measured. That is, only the original signal formed into the alternating-current is detected, and stray ions forming a constant current are not detected. Meanwhile, by a switch 503, a collector to be a comparison object of the lock-in amplifier 502 can be selected.

Figure 8:
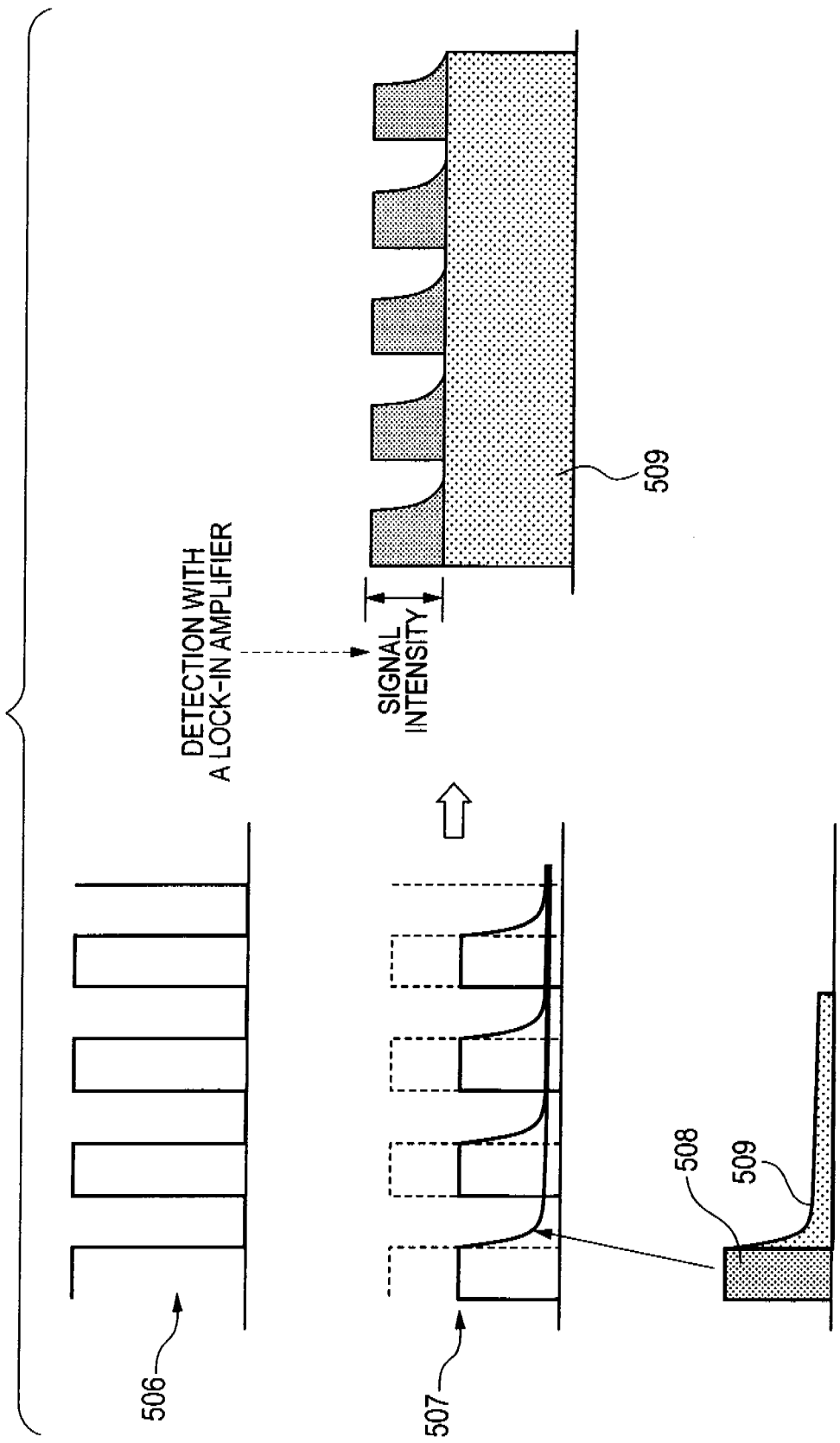
FIG. 8 is a drawing showing the operation in the third embodiment of the invention.

These situations are explained in FIG. 8.

In FIG. 8, a reference numeral 506 denotes an ion current detected by a collector when having not collided with the atmosphere gas, a reference numeral 507 denotes an ion current detected by a collector when having collided with the atmosphere gas. A reference numeral 508 denotes ions to be a signal (ions having reached a collector without a collision), and a reference numeral 509 denotes a stray ion to be noise.

In the embodiment, by the size reduction of the detection effective area of the collector 202 and the collector 203, a measure against the factor of the precision deterioration is performed, and, by the use of the lock-in (modulation synchronization type) amplifier 502, a measure against stray ions is performed, to give a synergistic effect of these. Caused by the synergistic effect, even when three electrodes are not provided for the beam angle-restricting plate, the stray ion-hindering plate and the stray ion-absorbing plate, which are necessary in the second embodiment, the improvement of the precision and the measure against stray ions can be performed. However, each of the measures exerts usefulness singly, too, and can also be used independently.

As described above, in the embodiment, by performing measures against precision deterioration and stray ions with a simple structure, remarkable improvement of measurement precision is made possible.

Fourth Embodiment

Figure 9:
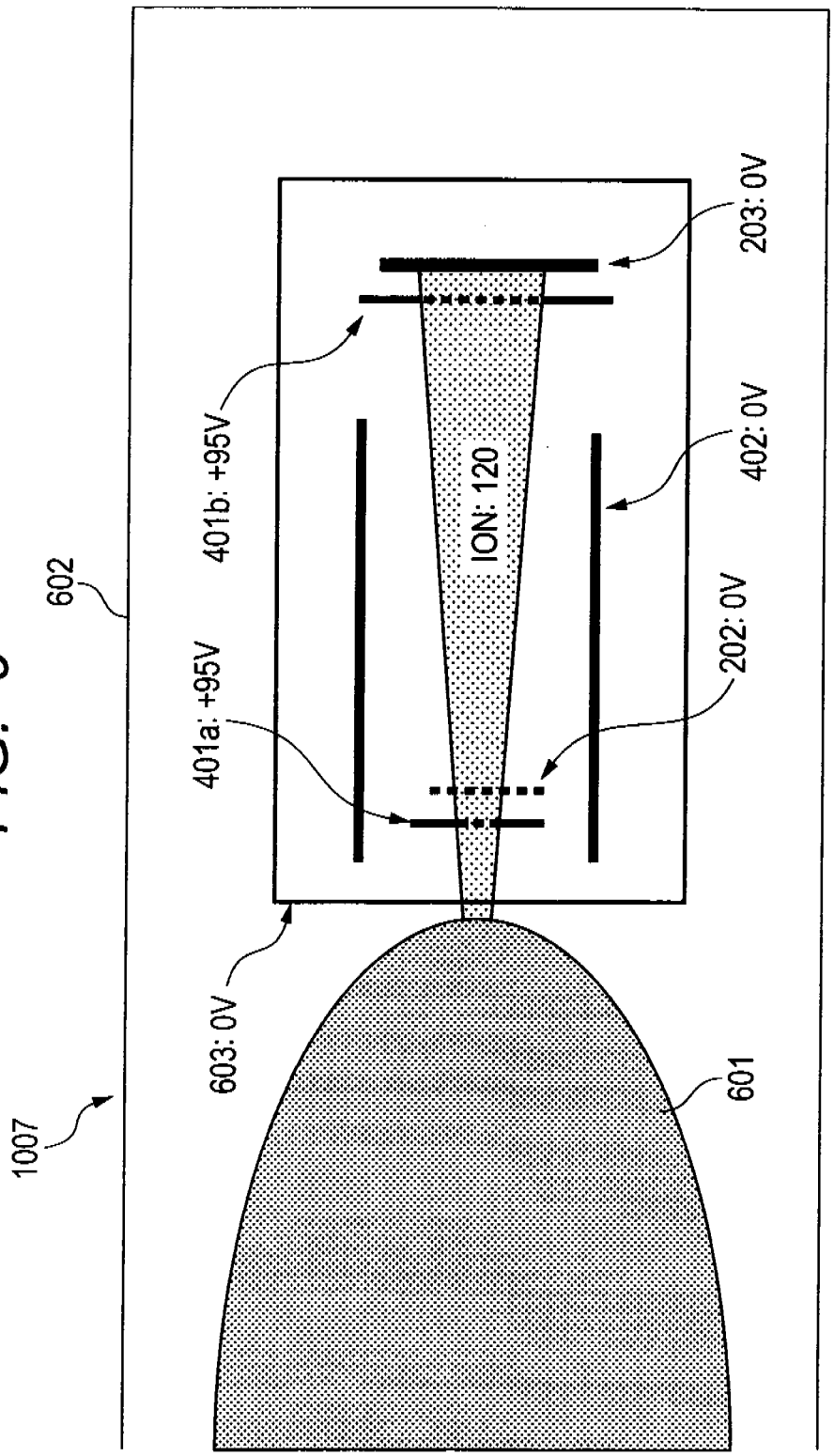
FIG. 9 is a drawing showing a device for measuring a mean free path according to a fourth embodiment of the invention.

FIG. 9 is a drawing showing a device for measuring a mean free path according to a fourth embodiment of the invention, which, as a device, does not possess an ion source and utilizes ions coming flying from an atmosphere to be measured such as plasma. Each of electrodes is substantially the same as that in the second embodiment (FIG. 6), and the device 1007 includes stray ion-hindering plates 401a and 401b, a stray ion-absorbing plate 402, and a shield case 603.

The shield case 603 has the same function as the beam angle-restricting plate 400, and encloses the whole of electrode part so that stray ions do not enter the part. The shield case 603 has the earth potential (0 V). The shield case 603 is of a metal plate (thickness is about 1 mm) made of SUS etc., and has such a structure that includes a hole (φ is about 2 mm) in the side face facing a plasma 601 and is sealed excluding the hole. The potentials of the stray ion-hindering plates 401a and 401b are set to be variable about from +5 V to +50 V. All the other dimensions of respective electrodes, materials and potentials are the same as those in the second embodiment. A measurement procedure explained below excluding an ion source is the same as that in the second embodiment, and the calculation method, range of the vacuum degree etc. are exactly the same.

In the embodiment, the device 1007 furthermore includes a plasma shielding plate 602, and a means for generating the plasma 601 (not shown) inside the plasma shielding plate 602. The plasma 601 can be generated by a method usually used. The plasma (a reduced pressure plasma) is naturally generated in a vacuum vessel, but, usually, is generated in a region covered with the plasma shielding plate 602 as a measure against pollution of the inside wall of the vacuum vessel and vacuum parts, and a vacuum pump and a vacuum gauge are set up outside the plasma shielding plate 602 (a space between the inside wall of the vacuum vessel and the plate). In order to perform sufficiently a measure against pollution, the sealing degree of the plasma shielding plate 602 must be high, but, on the other hand, in that case, there is such a serious problem that the inside and the outside of the plasma shielding plate 602 have different vacuum degrees, and that the important vacuum degree inside the plasma shielding plate 602 can not be known. In conventional vacuum gauges, since an absolute value of a minute current is necessary, it is absolutely impossible to set up a gauge inside the plasma shielding plate 602 where ions or electrons from the plasma 601 exist in a high concentration. However, in the embodiment, this can be realized with a simple structure.

In the embodiment, as a device, no ion source is included, but, usually, since positive ions having such a high energy as about from 10 to 30 eV are emitted from the central part of a plasma, an ion 120 from the plasma 601 is used for the measurement. In the method of the invention, the current quantity itself to be measured is irrelevant to the measurement result, and only the ratio of current quantities of the first and second collectors is necessary. Accordingly, in the embodiment, even when the current value is never known and, moreover, the value varies, the measurement can be performed with no problem. However, since ions having a low energy from the plasma exist in a larger quantity, in order to be distinguished from these, the potential of the stray ion-hindering plates 401a and 401b are adjusted to measure only plus ions having high energies. Moreover, since the ion source in the embodiment does not have a component corresponding to the internal collector and $I_0$ is unknown, from $I_{L1}$ by the collector 202 as the first collector and $I_{L2}$ by the collector 203 as the second collector, the mean free path is calculated using Formula (5).

In FIG. 9, the electrode in the shield case 603 is set to be the same as the electrode in the second embodiment (FIG. 6), but the configuration in the shield case 603 may also be set to be the same as the configuration in the third embodiment (FIG. 7). In other words, it may be formed into such a simple structure that the ion blanking 501 and the collectors 202 and 203 are set up in the shield case 603. But, the low potential applied to mesh in the ion blanking 501 (the potential at the bottom of the rectangular wave) is not 0 V but is set to be variable about from +5 V to +50 V (while leaving the high potential at about 100 V) to eliminate ions 110 having low energies. In addition, there is such a merit as capable of eliminating an electric influence from the plasma 601 (and a plasma generation device) by the use of the lock-in amplifier.

As described above, in the embodiment, by utilizing ions from a plasma, the measurement in a plasma region is made possible, which has conventionally been impossible.

Fifth Embodiment

Figure 10:
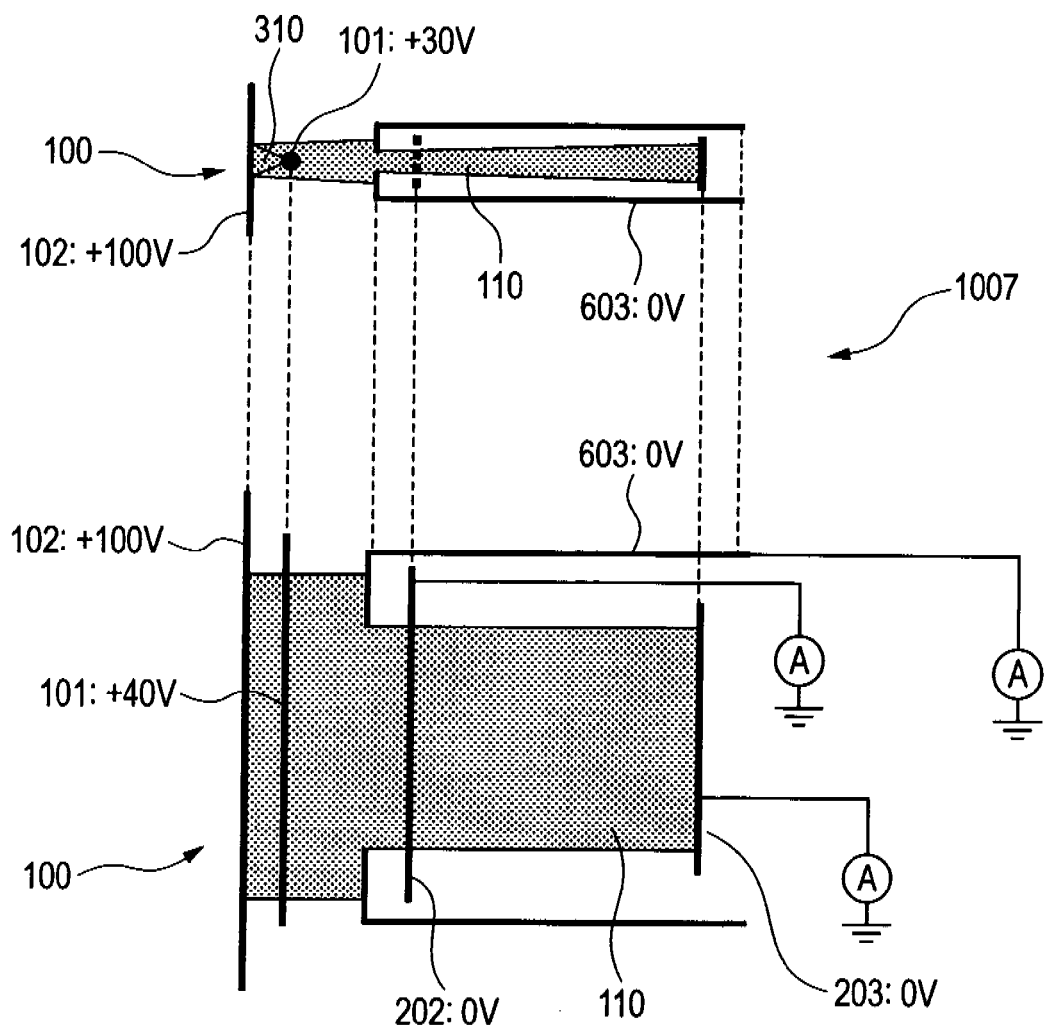
FIG. 10 is a drawing showing a device for measuring a mean free path according to a fifth embodiment of the invention.

FIG. 10 is a drawing showing a device for measuring a mean free path according to a fifth embodiment of the invention, and the device 1007 according to the embodiment is suitable for regions of vacuum degrees more inferior to those in the above-mentioned respective embodiments. In FIG. 10, the downside drawing is a front view, and the upside drawing is a top view. The permeable type collector 202 is the same as the collector in respective embodiments, but, as the ion source 100, a simple one is used, having a wholly long and thin shape. The ion source 100 has only the grid 102 in a plate shape (about 8 mm×2 mm, electrons can not permeate) made of SUS etc., and the filament 101 of a wire (φ of about 0.2 mm, length of about 8 mm) made of tungsten. Meanwhile, the grid of the embodiment is different form the grid up to the third embodiment, which is cylindrical and allows electrons to permeate to generate ions in the inside, is plate-like, performs ionization near the grid, and, therefore, it is unnecessary to make electrons to permeate. Consequently, a simple close plate is used, instead of mesh/lattice-like shape. A voltage of +100 V is applied to the grid 102, about +30 V to the filament 101, and the interval between the two is about 1 mm.

An electron 310 emitted from the filament 101 proceeds toward the grid 102, and collides with the atmosphere gas near the grid 102 to generate the ion 110 of a positive charge. Since the ion 110 is generated substantially at the potential of the grid 102 (+100 V), it proceeds toward the shield case 603, in a direction opposite to the beam of the electron 310. Since the front side of the shield case 603 (grid 102, filament 101 side) includes a slit (about 8 mm×2 mm), the ion 110 having reached the slit proceeds into the inside of the shield case 603. The interval between the grid 102 and the front face of the shield case 603 is set to be about 3 mm, and the interval between the front face of the shield case 603 and the collector 202 is set to be 1 mm. The collector 202 (about 5 mm×1.5 mm) is of mesh (the interval of 0.3 mm and permeability coefficient of about 50%) made of SUS etc., and the collector 203 (about 5 mm×1.5 mm) is of a plate made of SUS etc. The interval between the collector 202 and the collector 203 is accurately set to be 5 mm.

The shield case 603 is of a metal plate (thickness of about 1 mm) made of SUS etc., and encloses both collectors 202 and 203 so that stray ions do not enter the case from the outside (when compared with the case for plasma in FIG. 9, a sealing level is less severe). The shape of the shield case 603 is as long and thin as a cigarette case (and, the beam of the ion 110 is also long and thin). Accordingly, stray ions generated in the flying region of ions are liable to be absorbed by the shield case 603 lying nearer, instead of reaching a collector lying farther. And, the shield case 603 is connected to an ammeter to be capable of measuring an ion current flowing into the shield case 603 (mainly near the slit on the front side), and corresponds to the internal collector 201 in FIGS. 5 to 7. The front face of the shield case 603 has such a structure as catching a part of ions and allowing other ions to permeate, in the same way as the permeable collector 202, it can function as the internal collector by performing the correction with the decay. In other words, the shield case 603 has functions of blocking and absorbing stray ions, and of the internal collector. Meanwhile, regarding the potential, both the collectors 202 and 203, and the shield case 603 are earthed (0 V).

A vacuum gauge in which a plate-like grid and collector are arranged on both sides of a filament is known as a Schulz gauge, which bases on the same principle as an ion gauge of a cylindrical grid but has an applicable vacuum degree of about from 0.1 Pa to 100 Pa shifted to a more inferior vacuum degree. That is, the principle, in which electrons generated from a filament are accelerated with a grid and are collided with an atmosphere gas to generate ions and the ions are collected with a collector to measure an ion current, is exactly the same. But, it is constituted so that the grid is formed in a plate-like shape and is set near the filament and the generation efficiency of ions are made small to reduce the effect of space charges due to ions, and that the collector is also set near the filament to accelerate the catch of ions to make an operation be possible at a vacuum degree more inferior to 10 Pa, which is the limit in ion gauges. The grid 102, the filament 101 and the front of the shield case 603 in the embodiment have substantially the same structure as that of the Schulz gauge, and, therefore, it is possible to measure vacuum degrees in a range of about 0.1 Pa to 100 Pa.

The measurement procedure of the mean free path in the embodiment is exactly the same as that in the first embodiment, and, it is also the same that "the calibration without the decay" is performed in advance when a high precision is required. But, the flight distance is made shorter such that the distance between the collector 202 and the collector 203 is 5 mm, and that the distance between the front of the shield case 603 as the internal collector and the collector 202 is 1 mm. Accordingly, the measurement about from 0.4 Pa to 6 Pa is performed by the former according to Formula (5), and the measurement about from 2 Pa to 30 Pa is performed by the latter according to Formula (3). And, "the vacuum gauge calibration" is also the same as the calibration in the first embodiment, but since the operation is similar to the Schulz gauge, measurements about from 0.1 Pa to 100 Pa can be performed.

As described above, in the embodiment, measurements in a range of 0.1 Pa to 100 Pa with high precision is made possible with a very simple structure.

Sixth Embodiment

Figure 11A:
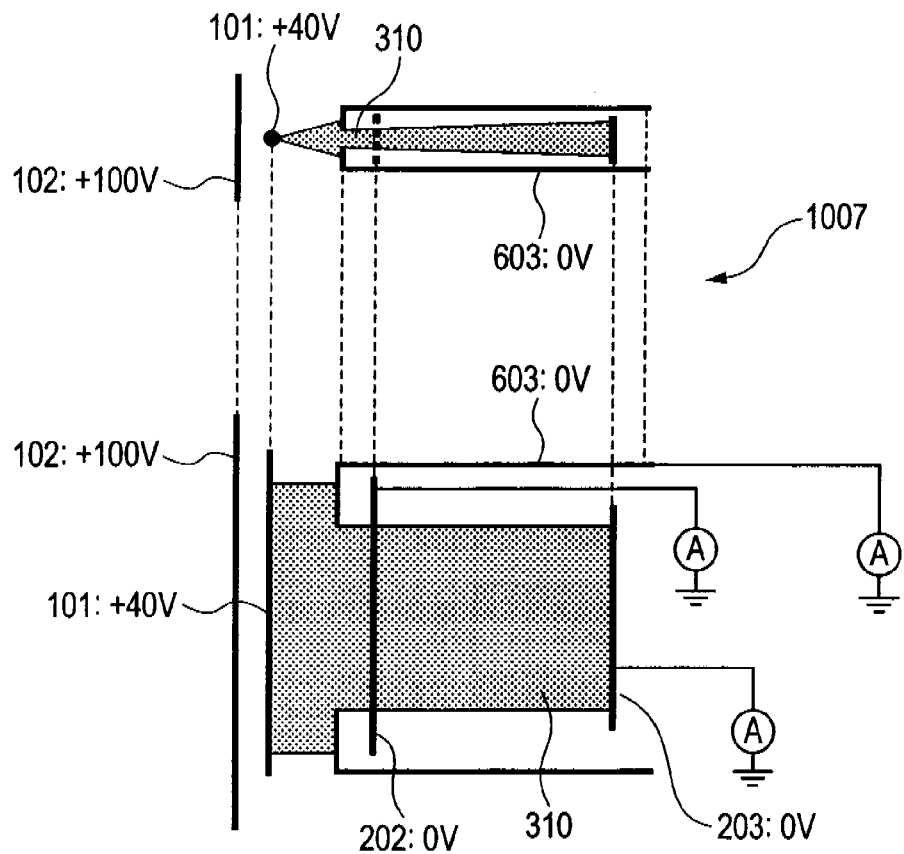
FIG. 11A is a drawing showing a device for measuring a mean free path according to a sixth embodiment of the invention.
Figure 11B:
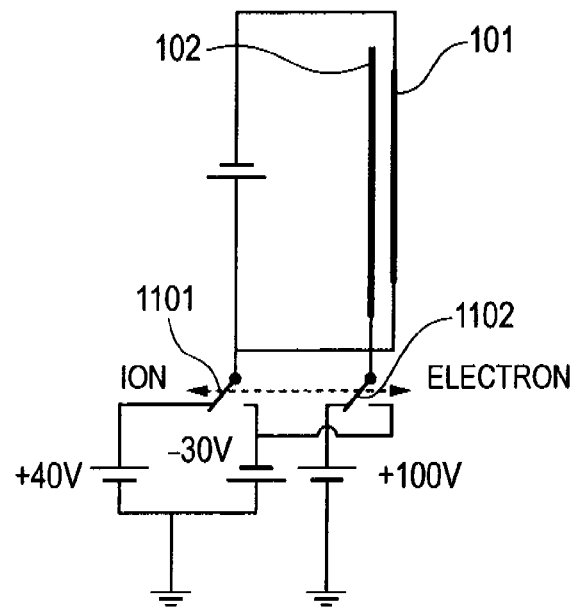
FIG. 11B is a drawing showing a control circuit of a filament/grid of the device shown in FIG. 11A.

FIG. 11A is a drawing showing a device for measuring a mean free path according to a sixth embodiment of the invention. Meanwhile, the upside drawing in FIG. 11A is a top view of the device 1007 according to the embodiment, and the downside drawing is a front view. FIG. 11B is a drawing showing a control circuit of the filament/grid of the device 1007 shown in FIG. 11A. The device 1007 according to the embodiment is constituted so that charged particles used for a measurement can be switched between ions and electrons to make the performance of measurements of a broader range be possible. A part set up in the atmosphere is the same as the part in the fifth embodiment except for a voltage to be applied, but a control circuit of the filament/grid is replaced by a new one.

First, when ions are utilized, it is operated exactly in the same way as in the fifth embodiment, and the performance of "the calibration without the decay" and "the vacuum gauge calibration" according to need is also the same. That is, as shown in FIG. 11B, switches 1101 and 1102 are switched to apply a potential of +30 V to the filament 101, and to apply a potential of +100 V to the grid 102. The switching generates ions.

Next, when electrons are utilized, the filament 101 is set to be about −30 V, and the same potential as that of the filament 101 is also applied to the grid 102. That is, as shown in FIG. 11B, the switches 1101 and 1102 are switched to apply a potential of −30 V to the filament 101 and the grid 102. The switching reverses the traveling direction of electrons, and electrons are introduced into the flying region lying on the side opposite to the grid 102 (the right side in FIG. 11A). The electron 310 emitted from the filament 101 is drawn toward the shield case 603 of the earth potential, and proceeds into the inside of the shield case 603 from the slit. The electron 310 acts in the same way as the case of ions such as the subsequent collision with the atmosphere gas and arrival at the collectors 202 and 203/measurement, but, since the electron has the mean free path of five times the mean free path of ions, the vacuum degree to be applied may be more inferior up to about five times. Meanwhile, electrons generate secondary electron emission with a lower collision energy as compared with ions, but, in the embodiment, since the collision energy to the collector is about 30 eV, the influence of the secondary electron emission in an electron current measurement is slight.

Accordingly, in the case of electrons, it is possible to perform a measurement of about 2 Pa to 30 Pa by the collector 202 and the collector 203 according to Formula (5), and a measurement of about 10 Pa to 150 Pa by the front of the shield case 603 as the internal collector and the collector 202 according to Formula (3). Consequently, the combination with about 0.4 Pa to 6 Pa according to Formula (5) by ions extends the range in which the mean free path can directly be measured to from 0.4 Pa to 200 Pa.

As described above, in the embodiment, the switching between ion/electron makes the measurement of the mean free path in such a broad range as from 0.4 Pa to 200 Pa possible.

Seventh Embodiment

Figure 12A:
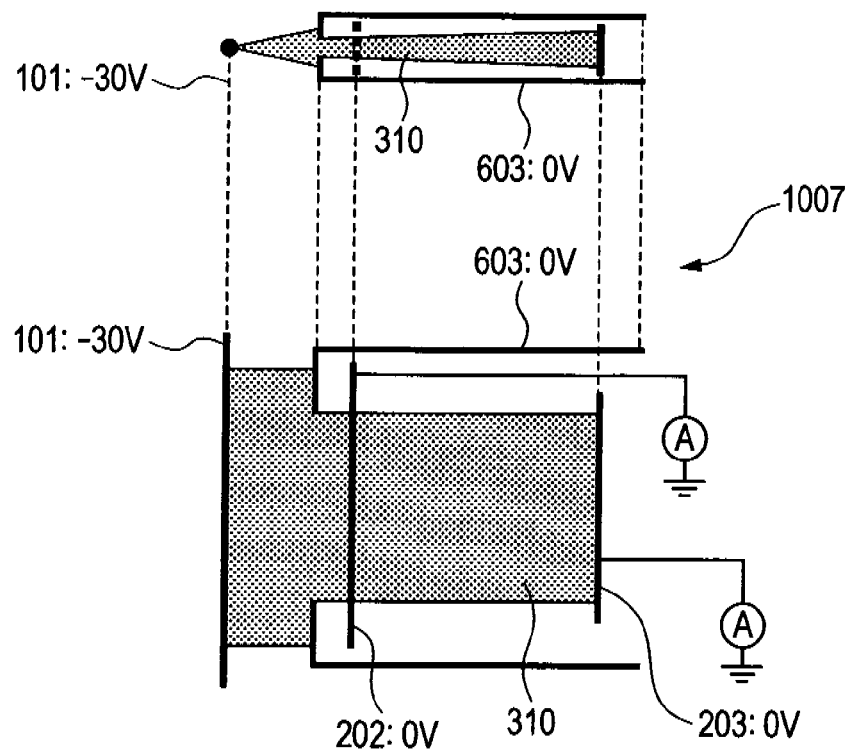
FIG. 12A is a drawing showing a device for measuring a mean free path according to a seventh embodiment of the invention.
Figure 12B:
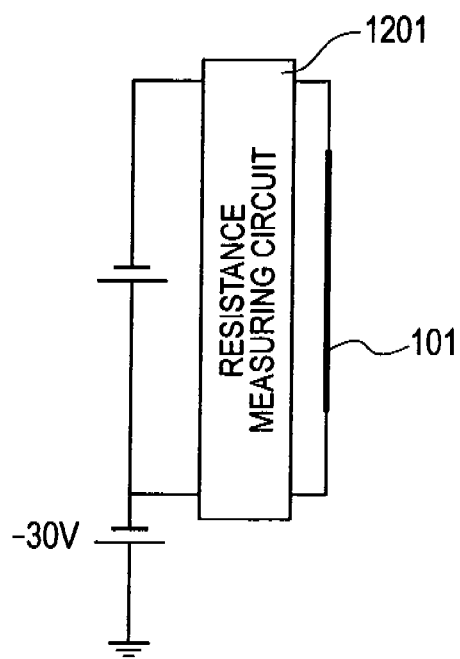
FIG. 12B is a drawing showing a control circuit of a filament of the device shown in FIG. 12A.

FIG. 12A is a drawing showing a device for measuring a mean free path according to a seventh embodiment of the invention. The upside drawing in FIG. 12A is a top view of the device 1007 according to the embodiment, and the downside drawing is a front view. FIG. 12B is a drawing showing the control circuit of the filament of the device 1007 shown in FIG. 12A. The device 1007 according to the embodiment has a simpler structure as a device exclusive for electrons, and is given a function of a Pirani gauge using the same filament 101. A part set up in the atmosphere is the same as the part in the sixth embodiment, except that no grid exists, but, as shown in FIG. 12B, the control circuit of the filament is replaced with a new one. The operation/procedure of measuring the mean free path by the electron 310 are exactly the same as those in the sixth embodiment, and the performance of "the calibration without the decay" and "the vacuum gauge calibration" according to need is also the same.

The Pirani gauge is robust and very versatile, and is used broadly for many applications. It utilizes that temperature of a heated filament (to be measured actually is a value of resistance having temperature dependency) depends on the vacuum degree of the atmosphere, and heating of the filament and a measurement of the value of resistance are necessary. Since the filament heating for measuring the mean free path can be diverted, it is sufficient that a new measurement of the value of resistance of the filament can be performed. Therefore, in the embodiment, as shown in FIG. 12B, a resistance measuring circuit 1201 is mounted on the control circuit of the filament 101.

The range of the vacuum degree applicable for the Pirani gauge is broad such as about from 1 Pa to 1000 Pa, but, as is the case for ion gauges, there is such a defect that the change of the absolute value of a signal quantity being the sensitivity (the converted value) is severe, and, therefore, the "vacuum gauge calibration" is very effective. "The vacuum gauge calibration" is similar to the calibration in the first embodiment, and, while maintaining the vacuum degree to a level at which the decay occurs by a known kind of gas, the measured value of the mean free path and the measured value by the Pirani gauge are compared to calibrate the sensitivity (the converted value) of the Pirani gauge. As the result, it is possible to perform a direct measurement of the mean free path at about from 2 Pa to 150 Pa, and a Pirani gauge measurement at about from 1 Pa to 1000 Pa.

As described above, in the embodiment, a measurement of high precision is made possible with the Pirani gauge being highly versatile by the "vacuum gauge calibration".

Eighth Embodiment

Figure 13A:
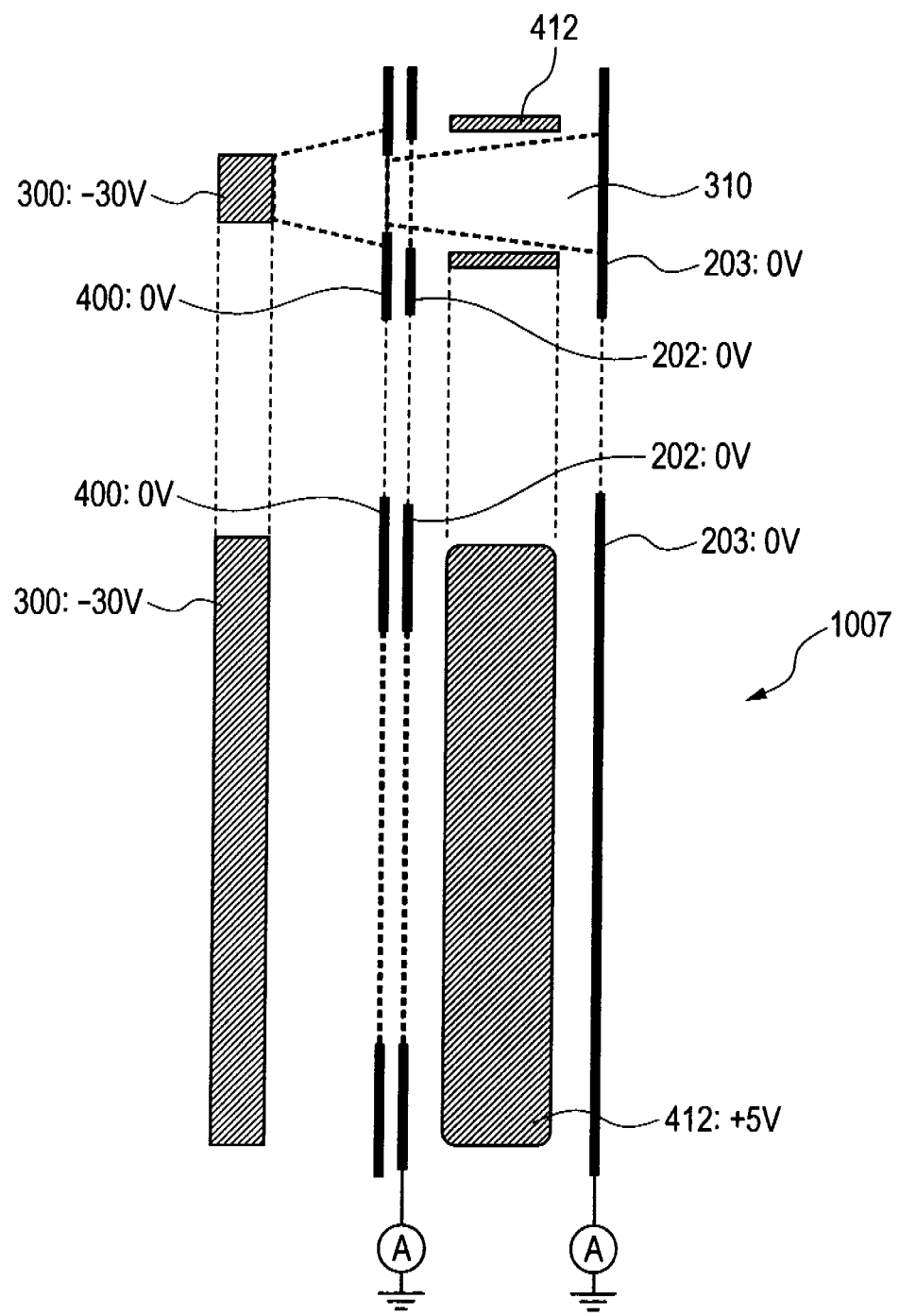
FIG. 13A is a drawing showing a device for measuring a mean free path according to an eighth embodiment of the invention.
Figure 13B:
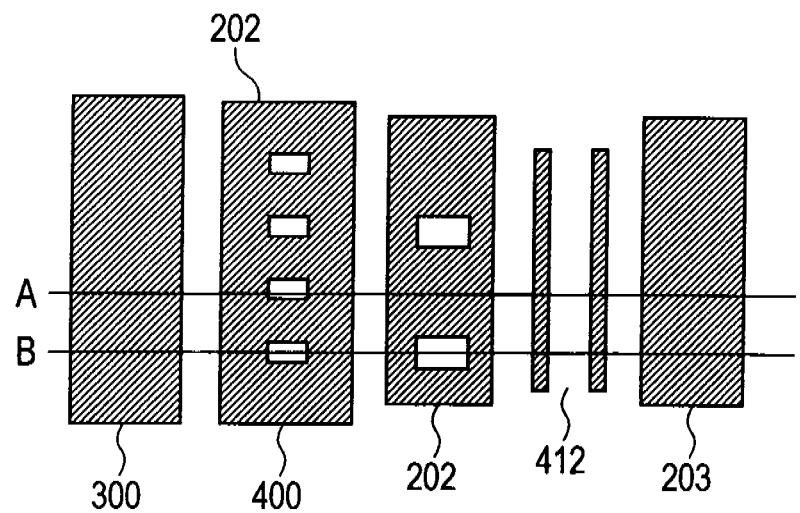
FIG. 13B is a drawing showing shapes of respective electrodes of the device shown in FIG. 13A.
Figure 13C:
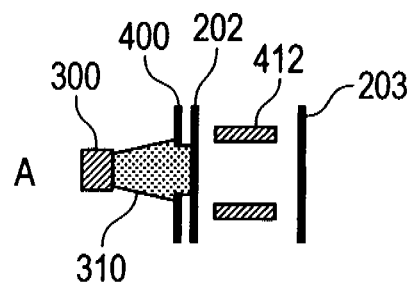
FIG. 13C is a drawing showing an electron beam trajectory on the line A in FIG. 13B.
Figure 13D:
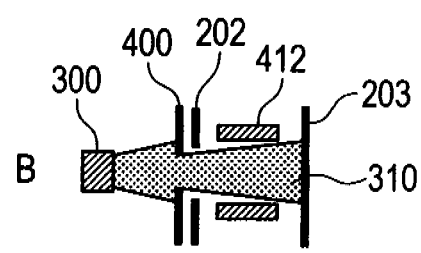
FIG. 13D is a drawing showing an electron beam trajectory on the line B in FIG. 13B.

FIG. 13A is a drawing showing a device for measuring a mean free path according to an eighth embodiment of the invention. The upside drawing in FIG. 13A is a top view of the device 1007 according to the embodiment, and the downside drawing is a front view. FIG. 13B is a drawing showing shapes of respective electrodes of the device shown in FIG. 13A, FIG. 13C is a drawing showing an electron beam trajectory on a line A in FIG. 13B, and FIG. 13D is a drawing showing an electron beam trajectory on a line B in FIG. 13B. In the device 1007 according to the embodiment, an electron source with a wide width (area) is used and the shape of the collector is devised so that action is possible without "the calibration without the decay". This is due to a following requirement. In the filament system with a high temperature up to 1800° C., there is such a problem as a reaction with the atmosphere gas, and an indirectly heated oxide cathode or another low temperature electron source capable of leading to a lower temperature are desired. However, such electron sources result in a significantly lowered brightness (intensity of electrons, emitted quantity of electrons per a unit area and a unit angle). Moreover, depending on applications, there is a case where the vacuum degree of the atmosphere can never be made sufficiently superior and "the calibration without the decay" can not be used.

The electron source 300 is an indirectly heated oxide cathode, in which the length is about three times (about 25 mm) as compared with the filament and the width is wide (about 3 mm). The beam angle-restricting plate 400 includes, as shown in FIG. 13B, four holes (small windows) of about 1.5 mm×3 mm at regular intervals. The collector 202 includes, as shown in FIG. 13B, two holes (small windows) of about 2 mm×4 mm so as to overlap partially the hole of the beam angle-restricting plate 400. The collector 203 has, as shown in FIG. 13B, no hole (small window).

In FIG. 13A, respective intervals between the surface of the electron source 300, the beam angle-restricting plate 400, the collector 202 and the collector 203 are about 5 mm, 1 mm and 5 mm, and the outer size of these is roughly about 30 mm×8 mm. Between the collector 202 and the collector 203, a stray electron absorption plate 412 is set up.

Each of the beam angle-restricting plate 400, the collector 202, the collector 203 and the stray electron absorption plate 412 is of a plate made of SUS etc. having a thickness of about 0.5 mm. The electron source 300 has a potential of −30 V, and the stray electron absorption plate 412 has a potential of +5 V, but all the other are set to be the earth potential (0 V).

The electron 310 emitted from the electron source 300 proceeds toward the beam angle-restricting plate 400, and passes through the four holes (small windows) of the beam angle-restricting plate 400. Among electrons 310 having passed through the four holes of the beam angle-restricting plate 400, electrons having passed through two holes are detected by the collector 202. On the other hand, electrons having passed through remaining two holes also pass through the holes (small windows) of the collector 202 and detected by the collector 203. The former situation is shown in FIG. 13C, and the latter situation is shown in FIG. 13D. The reason why the size of the hole (the small window) of the collector 202 is set to be larger than the size of the beam angle-restricting plate 400 is that the electron 310 flying to the collector 203 should not be detected by the collector 202. And, the reason why the collector 202 has two holes (small windows) but positions thereof are asymmetric is to cancel the influence of nonuniformity of the quantity of the electron 310 emitted from the electron source 300 in the longitudinal direction. As the result, either of detection ratios of the collector 202 and the collector 203 for the electron 310 is 50%.

In other words, in the embodiment the beam angle-restricting plate 400 having holes (opening parts) in a number larger than a number of holes (opening parts) provided in the permeable type collector 202 is located between the electron source 300 and the collector 202. Furthermore, holes provided in the beam angle-restricting plate 400 and holes provided in the collector 202 are registered so as to catch a part (for example, 50%) of electrons having passed holes provided in the beam angle-restricting plate 400 with the collector 202, and to allow other electrons (for example, 50%) to pass through.

The action/procedure of the measurement of the mean free path by the electron 310, and the range of the vacuum degree are the same as those in the seventh embodiment. But, different from a mesh shape in aforementioned embodiments, since the area of a hole (a small window) is large in the collector 202, the permeability coefficient thereof is estimated accurately and the permeability coefficient scarcely changes due to contamination, the calibration without the decay is not necessarily required. In other words, in order to realize permeable properties of the collector 202, the utilization of mesh is simplest, but there is difficulty in point of determining the important permeability coefficient, which is covered by the calibration without the decay. In contrast, the embodiment adopts such a structure that is slightly influenced by deformation/contamination and, furthermore, is capable of deciding the permeability coefficient by calculation, by forming the opening to be formed in the collector 202 by a hole-opening processing for a plate and making the area of one opening large, although it becomes complex. Consequently, it is so constituted that the measurement can be performed with a certain level of precision, even when the calibration without the decay is not performed.

And, since an electron source of a wide width is used, a too long and thin shape can not be adopted, and, therefore, in the embodiment, different from FIGS. 11 and 12, the stray electron absorption plate 412 applied with potential is necessary. In other words, for stray electrons, since there is a slight difference in the distance among the collectors 202 and 203 and the stray electron absorption plate 412, if the space is at a constant potential, considerable stray electrons possibly flow into both the collectors 202 and 203. Therefore, to the stray electron absorption plate 412, a potential of +5 V is applied so as to positively draw electrons. As the result, stray electrons do not reach both the collectors 202 and 203 and are absorbed by the stray electron absorption plate 412. Meanwhile, since electrons that should reach the collector 203 without colliding with the atmosphere gas have a kinetic energy of 30 V, they are not influenced by the stray electron absorption plate 412, and are measured normally by the collector 203. However, since the electron source has a wide width, it is somewhat difficult to prepare an electrode corresponding to the internal collector, differing from the fifth to seventh embodiments, it is not included in the embodiment.

Consequently, by detecting the number of electrons by the collector 202 and the collector 203, a measurement of about from 2 Pa to 30 Pa can be performed according to Formula (5). However, since there is no electrode corresponding to the internal collector, measurements at more inferior vacuum degrees can not be performed.

As described above, in the embodiment, an indirectly heated electron source of lower temperature can be used, and, even if "the calibration without the decay" is not performed, a measurement with high precision can be performed.

Ninth Embodiment

Figure 14A:
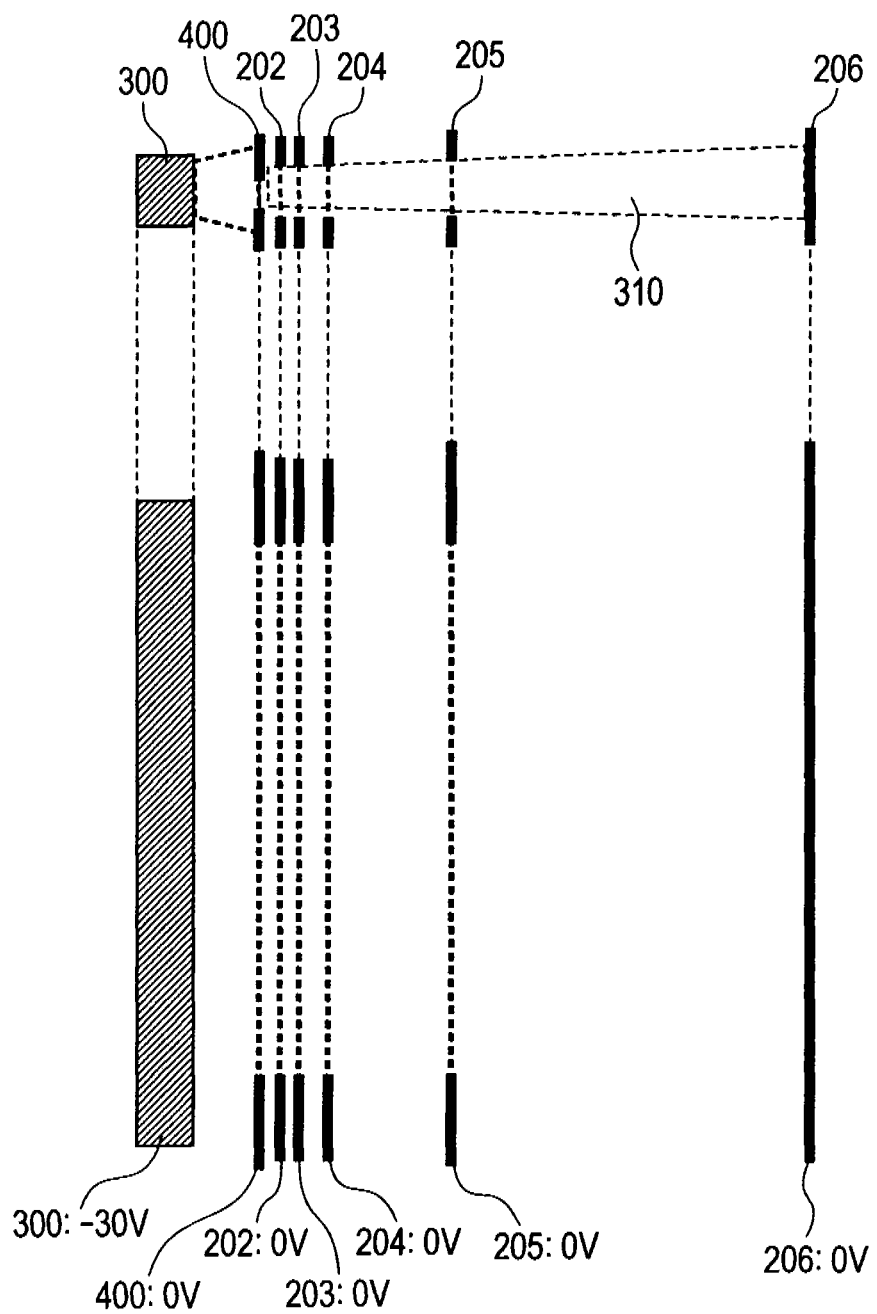
FIG. 14A is a drawing showing a device for measuring a mean free path according to a ninth embodiment of the invention.
Figure 14B:
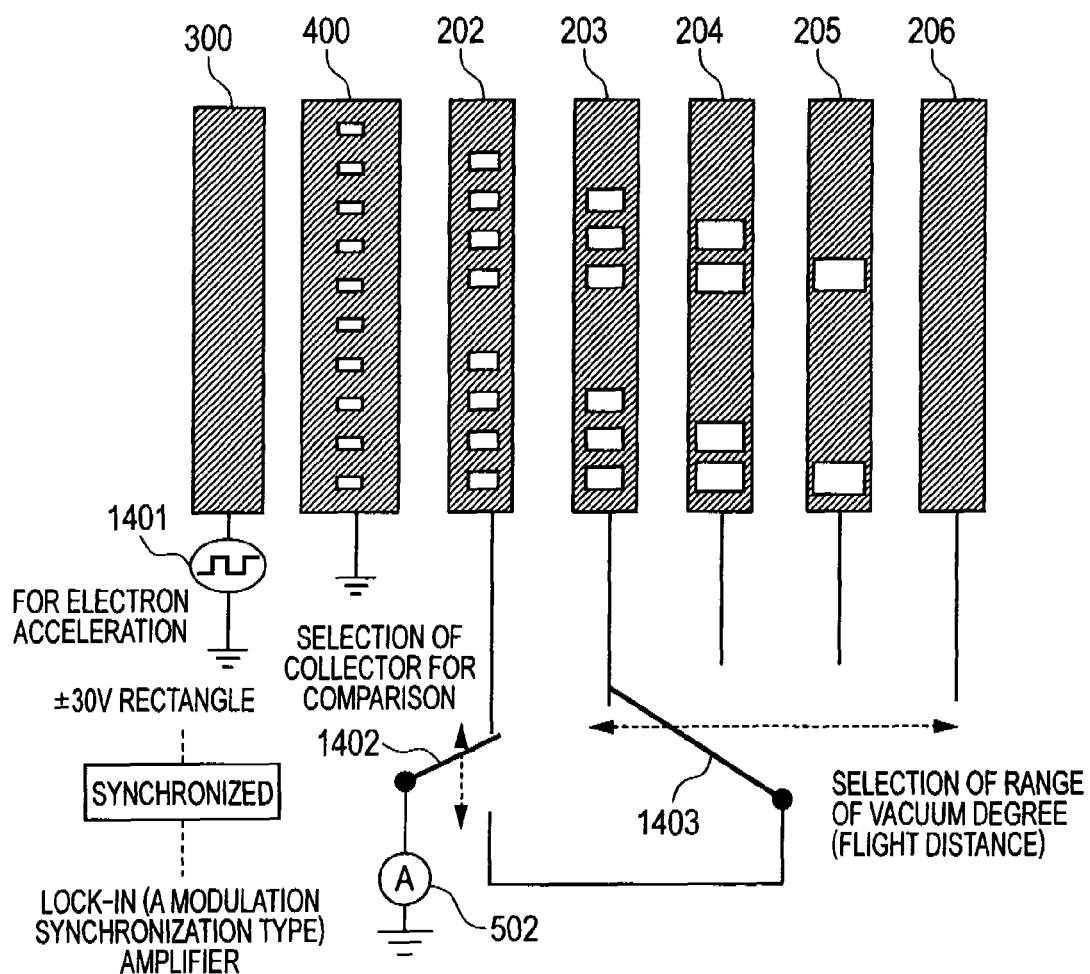
FIG. 14B is a drawing showing shapes of respective electrodes shown in FIG. 14A, and a circuit thereof.

FIG. 14A is a drawing showing a device for measuring a mean free path according to a ninth embodiment of the invention. Meanwhile, the upside drawing in FIG. 14A is a top view of the device 1007 according to the embodiment, and the downside drawing is a front view. FIG. 14B is a drawing showing shapes of respective electrodes shown in FIG. 14A, and a circuit thereof. In the device 1007 according to the embodiment, the use of many collectors expands the range of an applicable vacuum degree, in addition to the realization of a wide electron source and the omission of "the calibration without the decay". Fundamental structure/operation are the same as those of the eighth embodiment in FIG. 13, but the number of collectors is increased and a lock-in (modulation synchronization type) amplifier 502 is used. Accordingly, in the embodiment, the use of the stray electron absorption plate is unnecessary.

The electron source 300 is exactly the same as the electron source of the eighth embodiment. The beam angle-restricting plate 400 includes ten holes (small windows) of about 1 mm×2.5 mm at regular intervals. The collector 202 includes eight holes (small windows) of about 1.5 mm×3 mm so as to overlap the hole in the beam angle-restricting plate 400. In the same manner, the collector 203 includes six holes (small windows) of about 2 mm×3.5 mm so as to overlap the hole in the collector 202. The collector 204 includes four holes (small windows) of about 2.5 mm×4 mm so as to overlap the hole in the collector 203. The collector 205 includes two holes (small windows) of about 3 mm×4.5 mm so as to overlap the hole in the collector 204. The collector 206 has no hole (small window).

The distance between the surface of the electron source 300 and the beam angle-restricting plate 400 is about 5 mm, and respective distances from the collector 202 to the collectors 203, 204, 205 and 206 are set to be 0.15 mm, 0.5 mm, 1.5 mm and 5 mm. The outer shape thereof is roughly about 30 mm×8 mm. Each of the beam angle-restricting plate 400, the collectors 202 to 206 is of a plate made of SUS etc. of about 0.5 mm in thickness. Except for the electron source 300 (the electron source 300 has a potential of −30 V), the potential of all the electrodes is set to be the earth potential (0 V).

Each of the five collectors 202 to 206 detects only the electron 310 having passed through two holes (small windows) out of the electron 310 having passed through the ten holes (small windows) in the beam angle-restricting plate 400. Accordingly, the detection ratio of the electron 310 of respective collectors is 20%. Meanwhile, the number of electrons (the number of charged particles) detected by the collectors 204 to 206 is stored in the RAM 1003, as is the case for the collectors 202 and 203.

Since the flight distance is short and the stray electron absorption plate can not be set up, in the embodiment, as shown in FIG. 14B, the lock-in (modulation synchronization type) amplifier 502 eliminating electrically stray electrons is used. The configuration/operation of the lock-in (modulation synchronization type) amplifier is fundamentally the same as those in the third embodiment (FIGS. 7 and 8). But, electrons are used instead of ions, only to lead to a different polarity and a shorter time until the arrival at the collector without the collision. For the blanking, a rectangular potential of ±30 V is applied to the electron source 300, instead of mesh for blocking, the beam is blanked in the same manner. Of course, the switching between collectors is increased. In the embodiment, the switching of collectors is performed with switches 1402 and 1403. That is, the switch 1402 functions as a switch selecting a collector for a comparative object, and the switch 1403 functions as a switch selecting the range of the vacuum degree (the flight distance of electrons).

As shown in FIGS. 14A and 14B, as going from the collector 202 toward the collector 206, the flight distance of an electron becomes longer. And, the flight distance of an electron between respective collectors also becomes longer as going from the collector 202 toward the collector 206. Therefore, according to the selection of which collectors are set to be the first collector and the second collector, the range of measurable vacuum degrees differs.

For example, when using the collector 202 as the first collector and using the collector 203 as the second collector (the distance between collectors L2−L1=0.15 mm), the range of vacuum degrees by respective collectors is about from 60 Pa to 900 Pa. And, when using the collector 202 as the first collector and using the collector 204 as the second collector (the distance between collectors L2−L1=0.5 mm), the range of vacuum degrees is about from 20 Pa to 300 Pa. Moreover, when using the collector 202 as the first collector and using the collector 205 as the second collector (the distance between collectors L2−L1=1.5 mm), the range of vacuum degrees is about from 6 Pa to 90 Pa. Furthermore, when using the collector 202 as the first collector and using the collector 206 as the second collector (the distance between collectors L2−L1=5 mm), the range of vacuum degrees is about from 2 Pa to 30 Pa. (Each is calculated according to Formula (5).) Consequently, the range of vacuum degrees applicable as a whole is broadened such as from 2 Pa to 900 Pa.

As described above, in the embodiment, the measurement of the mean free path in such a wide range as from 2 Pa to 900 Pa is made possible by the switching between collectors.

Tenth Embodiment

Figure 15A:
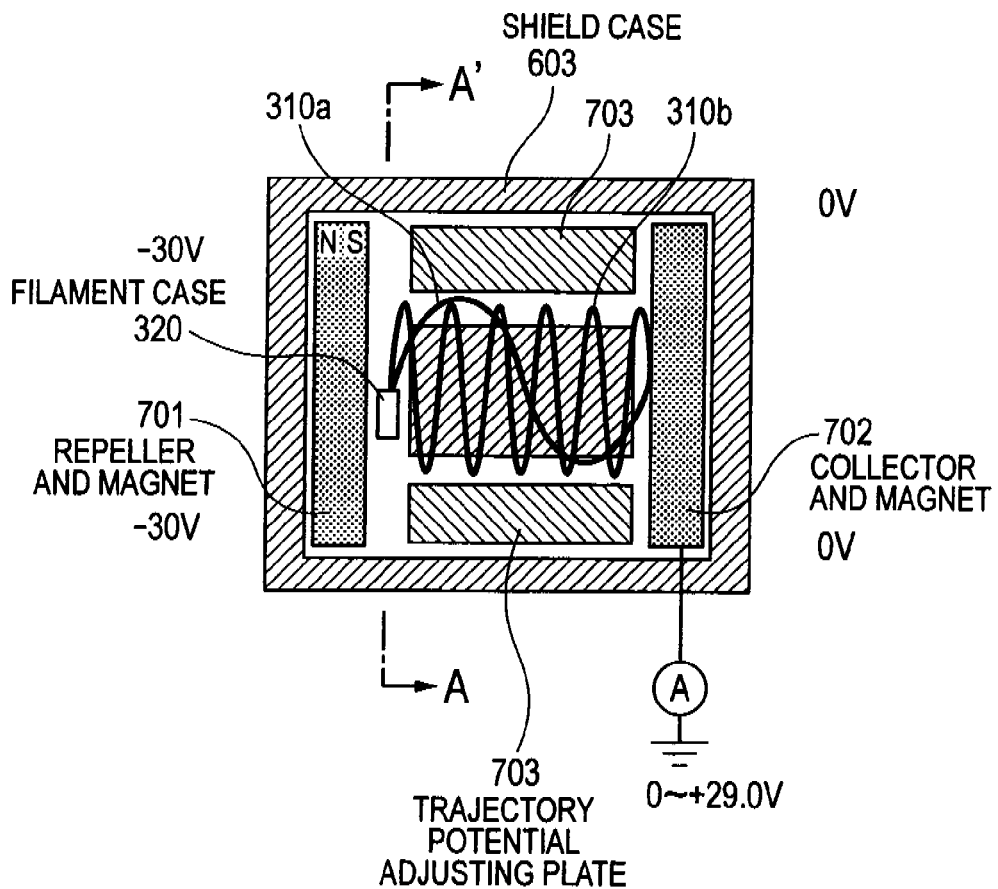
FIG. 15A is a drawing showing a device for measuring a mean free path according to a tenth embodiment of the invention.
Figure 15B:
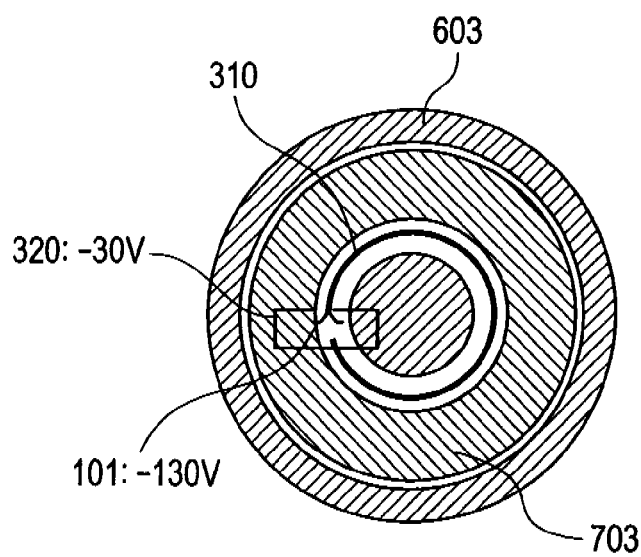
FIG. 15B is a cross-sectional view along the A-A' line in FIG. 15A.

FIG. 15A is a drawing showing a device for measuring a mean free path according to a tenth embodiment of the invention, and FIG. 15B is a cross-sectional view along the A-A' line in FIG. 15A. The embodiment is constituted so that different flight distances can be measured by one collector and, in addition, without changing a mechanical structure.

The principle of changing the distance bases on that electrons perform a helical movement when a magnetic field parallel to the traveling direction (the axial direction) exists, and that the number of the helix depends on the velocity (the kinetic energy) in the traveling direction. As charged particles, ions may also be utilized, but, since there are such problems that a strong magnetic field is necessary and the helical movement (the diameter) changes according to a gas species, electrons are used in the embodiment.

In the embodiment, between two magnets, the filament 101 and a filament case 320 enclosing it, and a trajectory potential adjusting plate 703 are set up, and the shield case 603 encloses the whole. The magnets are electroconductive magnets (such as alnico), both have about φ 60 mm×5 mm, one magnet serves as a repeller turning away the electron 310, and the other magnet serves as a collector.

The former shall be a magnet 701 also used as the repeller, and the latter shall be a magnet 702 also used as the collector. The distance of the two is about 80 mm, and the magnet field between these is adjusted to be 16 gausses.

The filament 101 is of a wire made of tungsten of about φ 0.2 mm and in a hair pin shape (the end thereof bends at a sharp angle). The filament case 320 is about 0.3 mm in thickness, and a box of about 6 mm×3 mm×30 mm, has a circular hole of about φ 1 mm in the upper face, which lies so that the tip of the filament 101 coincide with the center of the circular hole. This is well known as a method for forming a thin beam of the electron 310. The circular hole of the filament case 320 lies separated about 2 mm from the repeller and magnet 701 in the axial direction and about 20 mm from the axis, and faces the circumference of the circle. The trajectory potential adjusting plate 703 is of two fold cylinders (the inner diameter of the outer cylinder: about φ 45 mm, the outer diameter of the inner cylinder: about φ 35 mm, and electrons pass between φ 35 mm and φ 45 mm), and, by changing potentials thereof, the velocity of the electron 310 in the axial direction changes to enable the number of helices of helical movement of electrons to be adjusted.

The distance between the trajectory potential adjusting plate 703 and the magnet 702 (the axial direction) is about 5 mm. Since the filament case 320 and the trajectory potential adjusting plate 703 must be electroconductive and nonmagnetic, they are made of SUS.

The shield case 603 is made of pure iron (or magnetic stainless steel) of about 5 mm in thickness, and serves not only for shielding a disturbance magnetic field but also as a yoke of the magnet.

First, potentials of respective electrodes are set as follows. The potential of the repeller and magnet 701 is set to be −30 V, the potential of the collector and magnet 702 is set to be 0 V, the potential of the filament 101 is set to be −130 V, the potential of the filament case 320 is set to be −30 V, and the potential of the trajectory potential adjusting plate 703 is set to be 0 V. The electron 310 is emitted in the circumferential direction with a kinetic energy of 100V (the difference between the potential a −130 V of the filament 101 and the potential −30 V of the filament case 320), and, since a magnetic field of 16 gausses are applied in the axial direction (the left and right direction in the drawing), it performs a circumferential movement of about 40 mm in diameter due to the Lorentz force. Between both magnets, since the potential in the radial direction (up and down in the drawing) is constant, and the magnetic field in the axial direction is also constant, the circumferential movement is continued until the electron reaches the collector and magnet 702. On the other hand, the potential in the axial direction changes immediately from −30 V of the repeller and magnet 701 and the filament case 320 to 0 V of the trajectory potential adjusting plate 703, and is constant subsequently, and, therefore, electrons perform a constant speed movement with a kinetic energy of 30 eV. Electrons perform a helical movement by the composition of the movement in the radial direction and the movement in the axial direction.

From a result of simulation, the following is known. When proceeding in the axial direction with a kinetic energy of 30 eV, the electron 310 performs a helical movement of substantially one rotation until the electron reaches the collector and magnet 702. Next, while keeping other conditions the same, only the potential of the trajectory potential adjusting plate 703 is set to be −29 V (that is, a kinetic energy of 1 eV), a helical movement of 5.5 rotations are performed. As described above, by changing the potential of the trajectory potential adjusting plate 703, a substantial flight distance can be changed even for the same collector. When detecting the electron 310 having reached the collector and magnet 702 under two conditions by which the flight distance has been changed, the mean free path can be detected in the same way as above-mentioned embodiments where two collectors exist. In FIG. 15A, reference numerals 310a and 310b roughly shows the situation. That is, when a potential of 0 V is applied to the trajectory electron adjusting plate 703, the electron emitted from the filament case 320 follows the trajectory denoted by the reference numeral 310a, performs a helical movement of one rotation, and is detected by the collector and magnet 702. And, when a potential of −29 V is applied to the trajectory electron adjusting plate 703, the electron emitted from the filament case 320 follows the trajectory denoted by the reference numeral 310b, performs a helical movement of 5.5 rotations, and is detected by the collector and magnet 702.

Stray electrons having collided with the atmosphere gas and lost the kinetic energy have a small helix diameter, and are hard to pass between the internal and external diameters of the trajectory potential adjusting plate 703, and, therefore, the influence of stray electrons is small. And, since the collision energy of the electron 310 against the collector is about 130 eV (substantially corresponding to the difference between the potential −130 V of the filament 101 and the potential 0 V of the collector 702), emission ratio of secondary electrons is high, but secondary electrons having a small kinetic energy give a small helix diameter, and, therefore, the electrons do not scatter and return to the collector by a potential gradient. Accordingly, the influence of the secondary electron emission is small. Meanwhile, in order to deal with the variation of magnetic field intensity, the potential of the filament 101 (the kinetic energy of the electron 310 in the circumferential direction) is adjusted prior to the measurement so that an electron current to be received by the collector and electrode 702 becomes the largest. Because, since, at the largest current, the helix diameter of the electron 310 lies in the middle between the inner diameter of the external cylinder and the outer diameter of the internal cylinder, the flight distance can be estimated correctly.

An actual flight distance is the square root of the sum of the square of "the distance between collectors" and the square of "helix diameter×helix number×π". In the embodiment, since the distance between collectors is 80 mm and the helix diameter is 40 mm, the flight distance is 149 mm in one helical rotation, and 820 mm in 5.5 helical rotations. Then, while denoting the flight distance of 149 mm in one helical rotation by L1 and the electron current by $I_{L1}$, and, on the other hand, denoting the flight distance of 533 mm in 5.5 rotations by L2 and the electron current by $I_{L2}$, the mean free path can be obtained according to Formula (5). The applicable range of vacuum degrees is, in 1 & 5.5 rotations, about from 0.02 Pa to 0.3 Pa.

More specifically, the applied potential to the trajectory potential adjusting plate 703 and the flight distance corresponding to the potential are correlated in a table and stored. Since the helix number is determined by the applied potential to the trajectory potential adjusting plate 703, the control part 1000 stores the number of first electrons (the electron current) detected by the collector and magnet 702 when a first potential is applied to the trajectory potential adjusting plate 703, and the number of second electrons (the electron current) detected by the collector and magnet 702 when a second potential is applied to the trajectory potential adjusting plate 703, respectively, in the RAM 1003. Subsequently, the control part 1000 refers to the table and obtains the first flight distance corresponding to the first potential applied to the trajectory potential adjusting plate 703, and the second flight distance corresponding to the second potential applied to the trajectory potential adjusting plate 703 (the second flight distance>the first flight distance; accordingly, the first flight distance is L1, and the second flight distance is L2), and obtains the number of first electrons $I_{L1}$ and the number of second electrons $I_{L2}$ from the RAM 1003. Subsequently, the control part 1000 calculates the mean free path using Formula (5), in the same manner as in the first embodiment.

Or, it may be so constituted that the number of electrons detected with an ammeter connected to the collector and magnet 702 is displayed. In this case, a user inputs the value displayed on the ammeter and the flight distance corresponding to the value to the control part 1000 via the input operation part 1005, and, furthermore, inputs an instruction of the calculation of the mean free path. The control part 1000 obtains the flight distance and the number of electrons by these input of the user, and, according to the instruction of the calculation, performs the calculation of the mean free path according to either of Formulae (3) to (5). Or, a user may input the value displayed on the ammeter to a scientific electronic calculator. In this case, according to the input of the user, the scientific electronic calculator is to obtain the flight distance of electrons and the number of electrons after the decay, and the scientific electronic calculator can perform either of Formulae (3) to (5).

In either of the cases, the operational device for calculating the mean free path (the control part 1000, a computer separated from the control part 1000, a scientific electronic calculator etc.) can obtain the flight distance of electrons and the number of electrons after the decay, according to transmission from the device 1007, or a user input via an input operation part such as a keyboard or a touch panel.

As described above, in the embodiment, the measurement of the mean free path by an arbitrary flight distance is made possible with a set of collectors.

Other Embodiments

Hereinbefore, respective embodiments have been explained, but the embodiments of the invention are not limited to these, and, of course, it is possible to combine or replace each of elements of respective embodiments. And, the whole structure, and the shape, size, material and applied voltage of the respective electrodes are not limited to those in the above-mentioned embodiments but can be selected arbitrarily.

As the whole structure, (substantially) two collectors are prepared outside the ion source (the electron source), but, in order to make the structure simpler, it is also possible to prepare the internal collector and only one outer collector to perform the calculation using Formula (3). Meanwhile, since the flight distance regarding the internal collector can be considered as 0, when denoting the current of the internal collector by $I_{L1}$ and the current of an outer collector by $I_{L2}$, and defining that L1=0, and L2=the flight distance regarding the outer collector, Formula (5) may be used directly. That is, Formula (5) is a formula capable of being applied to all of these.

The ion source is not limited to those in the above-mentioned embodiments, but a discharge/plasma type, a magnetic field (magnetron) type, an alkali metal type, a liquid metal type etc. may be selected arbitrarily, only if ions of an electric current of about from mA to nA are emitted. Since the alkali metal type in which a sintered body of alumina silicate containing Li oxide is heated to discharge a $Li^+$ ion etc., and the liquid metal type in which Au having been heated to become liquid is applied with a high voltage to discharge a $Au^+$ ion etc. supply specific ions of Li and Au, although not the ion of an atmosphere gas, they are applicable. And, negative ions are also acceptable. The electron source can also be selected arbitrarily from a discharge/plasma type, a field emission type, a photoelectron emission type etc., only if electrons of an electric current of the same degree as that in above-mentioned embodiments are emitted.

The detector is not restricted to plate-like and mesh-like collectors in the above-mentioned embodiments, but may be a Faraday cup-like collector, a multi channel plate or an electron-multiplier tube. And, in above-mentioned embodiments, it is set to be one ion source and a plurality of collectors, but, inversely, it is also possible to set to be one collector and a plurality of ion sources, and to prepare a plurality of sets of one ion source and one collector (the same configuration as conventional ones). Meanwhile, in any of cases having a plurality of collectors, both measurements of the number of the first charged particles and the number of the second charged particles can be performed at the same time, or both can be measured by the switching in a short time. When performing both measurements of the number of the first charged particles and the number of the second charged particles, it is also possible to constitute from the beginning a detection circuit capable of measuring a current ratio, instead of measuring respective currents with respective detection circuits.

A method for assembling an electrode such as a collector, fine processing technologies (MEMS) advanced from semiconductor technologies can also be used, without being restricted to charged particle-generating configurations fabricated by a mechanical method similar to fabricate conventional vacuum gauges (ion gauges and Schulz gauge) in the above-mentioned embodiments. According to MEMS, the flight distance can be shortened easily, and it is suitable for measurements at more inferior vacuum degrees.

In order to perform a measure against stray ions (electrons) more strictly, it is also effective to apply a potential for positively pulling nearer stray ions to the stray ion-absorbing plate, instead of the earth potential. And, in order not to allow ions having lost there energies to reach the collector, it is also possible to bent them in lateral directions by a deflecting electric field, instead of a blocking field. Furthermore, it is also effective to set up the collector in a deflected direction from the beginning.

"The vacuum gauge calibration" for performing the calibration of conventional type vacuum gauges is not restricted to one housed in the device of the invention as is the case for above embodiments, but it can also be performed by an interchange of signals with another independent vacuum gauge via a cable connection. That is, for example, device 1007 can transmit the value itself of the calculated mean free path, or the value of pressure obtained by conversion of the value of the mean free path, to the other independent vacuum gauge. As a result, while using an existing vacuum gauge, the measurement precision can be enhanced.

For calculating the mean free path, without being restricted to the calculation formulae in above embodiments, it is also possible to utilize a formula to which a correction term (experimental formula) having obtained empirically is added while basing on the calculation formulae.

Furthermore, the calculation formula of the mean free path in these programs are not restricted to the Formula (3), Formula (4) or Formula (5), but a formula obtained by correcting a part of these formulae can be used.

As described in the term 15) "Factors that deteriorate precision", "a shift" from an ideal state indispensably occurs, wherein if relevant conditions (ion current, ion energy, ion species etc.) are the same, frequently "the shift" is also substantially the same. Then, it is possible to measure "the shift" experimentally (empirically), and to obtain a calculation formula for correcting it, that is, a calculation formula incorporated with an experimental formula (a correction term). By using a program according to a calculation formula (for example, $\lambda=(L2-L1)/\ln(I_{L1}/I_{L2})\times F+G$) incorporated with an experimental formula (for example, an experimental formula F regarding multiplication, and an experimental formula G regarding addition), a measurement with higher precision can be performed. And, furthermore, since the correction term depends on relevant conditions, by performing experiments under several conditions, it becomes possible to obtain a function of the correction term using relevant conditions as variables (for example, experimental formulae F and G). The use of this makes it possible to perform a measurement with furthermore better precision.

As a method for expand or change the flight distance, various method for controlling a trajectory known in a time of flight (TOF) mass spectrometer, for example, a reflectron system in which ions are reciprocated, a multi turn system in which ions are circled on the same trajectory, or a spiral system in which ions are circled on a helical trajectory etc. can be utilized. And, a method in which one collector is moved on an axis in the flying direction, or a method in which a collector for performing a measurement is selected while moving a plurality of collectors in a direction perpendicular to the axis (on the axis and to the outside of the axis) may be possible.

As a mass spectrometer that becomes necessary for measuring vacuum degrees of respective components, without restricted to a quadrupole type, a magnetic field sector type capable of setting arbitrarily the distance between ion source/collector, a time of flight type, electric field/magnetic field superposed type etc. are also usable. And, an ion trap type (three dimensional and two dimensional) that can set arbitrarily a time substantially from the generation in an ion source until the detection by a collector, that is, an effective flight distance, although the distance between ion source/collector is the same, and an ion cyclotron type may also be used.

Furthermore Other Embodiments

The invention can be applied to a system constituted of a plurality of devices (for example, a computer, an interface device, a reader, a printer, the device 1007 etc.), or to an apparatus consisting of one device.

An processing method, in which a program for making the configuration of the above-mentioned embodiments to operate so as to realize the function of the control part 1000 of the above-mentioned embodiments is stored in a storage medium, the program stored in the storage medium is read out as code to be nun on a computer, is also included in the category of the above-mentioned embodiments. That is, a storage medium that a computer can read is also included in a range of examples. Moreover, of course the storage medium storing the computer program, and also the computer program itself are included in the embodiments.

As the storage medium, for example, a floppy (registered trade mark) disk, a hard disk, an optical disk, a magneto optical disk, a CD-ROM, a magnetic tape, a nonvolatile memory card, and a ROM can be used.

In addition, without being restricted to one performing an operation by the program single body stored in the storage medium, one performing the action of the embodiments while acting on an OS in association with a function of another software or an extension board is also included in the category of the embodiments.

The invention claimed is:

1. A device comprising:
   a generation source for generating the charged particle;
   a detection means having a first detector arranged at a position for detecting a number of first charged particles of charged particles having flied a first flight distance that is a flight distance of 0 or more from the generation source and a second detector arranged at a position for detecting a number of second charged particles of charged particles having flied a second flight distance longer than the first flight distance; and
   a calculation means for calculating the mean free path from a ratio between the numbers of the first and second charged particles,
   wherein the device is configured so that both charged particles flying the first and second flight distances which are generated from the generation source pass through an atmosphere gas to be measured to be detected by the detection means.

2. The device according to claim 1, wherein
   the generation source has:
   a filament for emitting an electron;
   a grid for drawing the electron to generate an ion near a front surface thereof; and
   a drawing electrode in a flat plate shape for drawing the generated ion, the drawing electrode being configured to allow, among ions reaching the electrode, a part of the ions to pass directly.

3. The device according to claim 1, wherein
   the generation source has:
   an electron source for emitting an electron; and
   a drawing electrode in a flat plate shape for drawing the emitted electron, the drawing electrode being configured to allow, among electrons reaching the electrode, a part of the electrons to pass directly.

4. The device according to claim 1, wherein
   the charged particle is an ion;
   the generation source has:
   a filament for emitting a thermal electron;
   a grid in a substantially cylindrical shape for drawing the thermal electron to generate an ion inside; and
   a collector in a wire shape placed inside the grid,
   wherein a length of the collector is made shorter than a length of the grid in an axial direction.

5. The device according to claim 4, wherein the length of the collector is about one-half of the length of the grid in the axial direction.

6. The device according to claim 1, wherein
   the first detector is a detector configured to detect, among charged particles reaching the detector, a part thereof and to allow another part of charged particles to pass directly.

7. The device according to claim 6, wherein:
   the configured detector has at least one opening part; and
   the detector having at least one opening part is a detector having a mesh shape, having a slit shape, or having at least one window.

8. The device according to claim 1, further comprising an electrode set up around a flying region of charged particle flying the first and second flight distances, and absorbing a charged particle having collided with an atmosphere gas to lose a kinetic energy.

9. The device according to claim 1, further comprising:
   a means for making charged particles reaching a detector intermittent; and
   a lock-in (modulation synchronization type) amplifier synchronized with the means, wherein the lock-in amplifier eliminates noise from the numbers of the detected first and second charged particles.

10. The device according to claim 1, wherein plasma existing in an atmosphere gas is utilized as a generation source for generating the charged particle.

11. A vacuum vessel comprising the device according to claim 1, further comprising a means for generating plasma in the vacuum vessel, wherein the generated plasma is used as the generation source.

* * * * *